US008655084B2

(12) United States Patent
Bebis et al.

(10) Patent No.: US 8,655,084 B2
(45) Date of Patent: Feb. 18, 2014

(54) HAND-BASED GENDER CLASSIFICATION

(75) Inventors: George Bebis, Reno, NV (US); Gholamreza Amayeh, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 707 days.

(21) Appl. No.: 12/821,948

(22) Filed: Jun. 23, 2010

(65) Prior Publication Data

US 2010/0322486 A1 Dec. 23, 2010

Related U.S. Application Data

(60) Provisional application No. 61/219,749, filed on Jun. 23, 2009.

(51) Int. Cl.
*G06K 9/62* (2006.01)

(52) U.S. Cl.
USPC ........... 382/224; 382/103; 382/115; 382/118; 382/124

(58) Field of Classification Search
USPC ................................ 382/224, 124, 115, 130
See application file for complete search history.

(56) References Cited

U.S. PATENT DOCUMENTS

| | | | |
|---|---|---|---|
| 4,573,193 A | 2/1986 | Shuto et al. | |
| 4,661,913 A * | 4/1987 | Wu et al. | 702/19 |
| 4,720,869 A | 1/1988 | Wadia | |
| 4,736,203 A | 4/1988 | Sidlauskas | |
| 4,896,363 A | 1/1990 | Taylor et al. | |
| 5,335,288 A | 8/1994 | Faulkner | |
| 5,483,601 A | 1/1996 | Faulkner | |
| 5,559,895 A | 9/1996 | Lee et al. | |
| 5,642,431 A * | 6/1997 | Poggio et al. | 382/118 |
| 5,995,637 A | 11/1999 | Petersen et al. | |
| 5,995,639 A | 11/1999 | Kado et al. | |
| 6,047,090 A | 4/2000 | Makram-Ebeid | |
| 6,157,731 A | 12/2000 | Hu et al. | |
| 6,219,639 B1 | 4/2001 | Bakis et al. | |
| 6,226,417 B1 | 5/2001 | Yamagata et al. | |
| 6,370,263 B1 | 4/2002 | Hiratsuka et al. | |
| 6,445,810 B2 * | 9/2002 | Darrell et al. | 382/115 |

(Continued)

OTHER PUBLICATIONS

Agarwal et al., "Learning to Detect Objects in Images Via a Sparse, Part-Based Representation," *IEEE Trans. on Pattern Analysis and Machine Intelligence*, vol. 26, No. 11, pp. 1475-1490 (2004).

(Continued)

*Primary Examiner* — Vu Le
*Assistant Examiner* — Aklilu Woldemariam
(74) *Attorney, Agent, or Firm* — Holland & Hart

(57) ABSTRACT

For each of at least one digitally-imaged hand part, where each of the at least one digitally-imaged hand part corresponds to one of a plurality of hand parts, a set of feature parameters representing a geometry of the digitally-imaged hand part is computed. The set(s) of feature parameters for a set of one or more of the digitally-imaged hand parts is/are used to compute distances of the set of digitally-imaged hand parts from each of i) a first eigenspace corresponding to a male class, and ii) a second eigenspace corresponding to a female class. The computed distances are used to classify the gender of a hand as belonging to the male class or the female class.

37 Claims, 26 Drawing Sheets

(56) References Cited

U.S. PATENT DOCUMENTS

| | | | |
|---|---|---|---|
| 6,631,204 B1* | 10/2003 | Smith | 382/130 |
| 6,681,032 B2 | 1/2004 | Bortolussi et al. | |
| 6,819,782 B1* | 11/2004 | Imagawa et al. | 382/115 |
| 6,873,713 B2 | 3/2005 | Okazaki et al. | |
| 6,961,450 B2 | 11/2005 | Takhiri et al. | |
| 7,043,094 B2 | 5/2006 | Thomas et al. | |
| 7,212,671 B2 | 5/2007 | Kim et al. | |
| 7,215,796 B2 | 5/2007 | Mizoguchi | |
| 7,318,051 B2* | 1/2008 | Weston et al. | 706/12 |
| 7,426,301 B2* | 9/2008 | Porikli | 382/181 |
| 7,715,600 B2 | 5/2010 | Avni et al. | |
| 7,912,246 B1* | 3/2011 | Moon et al. | 382/103 |
| 8,243,999 B2* | 8/2012 | Tobin et al. | 382/115 |
| 2002/0089413 A1 | 7/2002 | Heger et al. | |
| 2004/0017934 A1 | 1/2004 | Kocher | |
| 2004/0057604 A1 | 3/2004 | David et al. | |
| 2004/0088553 A1* | 5/2004 | Levin et al. | 713/186 |
| 2004/0151346 A1 | 8/2004 | Weiss | |
| 2004/0215615 A1 | 10/2004 | Larsson et al. | |
| 2004/0264742 A1 | 12/2004 | Zhang et al. | |
| 2005/0106536 A1* | 5/2005 | Liebermann | 434/112 |
| 2005/0111703 A1 | 5/2005 | Merbach et al. | |
| 2005/0131847 A1* | 6/2005 | Weston et al. | 706/12 |
| 2005/0207633 A1* | 9/2005 | Arini et al. | 382/133 |
| 2005/0238207 A1 | 10/2005 | Tavares | |
| 2006/0034492 A1 | 2/2006 | Siegel et al. | |
| 2006/0039593 A1* | 2/2006 | Sammak et al. | 382/133 |
| 2006/0078170 A1 | 4/2006 | Kamata et al. | |
| 2006/0147094 A1 | 7/2006 | Yoo | |
| 2006/0171571 A1 | 8/2006 | Chan et al. | |
| 2006/0177113 A1* | 8/2006 | Wrage | 382/124 |
| 2006/0245624 A1 | 11/2006 | Gallagher et al. | |
| 2007/0098223 A1 | 5/2007 | Kamata et al. | |
| 2007/0126733 A1* | 6/2007 | Yang et al. | 345/419 |
| 2008/0002892 A1* | 1/2008 | Jelonek et al. | 382/224 |
| 2009/0028434 A1* | 1/2009 | Vanhoucke et al. | 382/182 |
| 2009/0074259 A1 | 3/2009 | Baltatu et al. | |
| 2010/0021014 A1* | 1/2010 | Bebis | 382/115 |

OTHER PUBLICATIONS

Amayeh et al, "A Component-Based Approach to Hand Verification," *IEEE Workshop on Biometrics*, 8 pp. (Jun. 2007).

Amayeh et al., "A New Approach to Hand-Based Authentication," *SPIE Defense and Security Symp.: Biometric Technology for Human Identification IV*, 9 pp. (Apr. 2007).

Amayeh et al., "Accurate and Efficient Computation of High Order Zernike Moments," *First Int'l Symp. on Visual Computing*, pp. 462-469 (Dec. 2005).

Amayeh et al., "Hand-Based Verification and Identification Using Palm-Finger Segmentation and Fusion," *Journal of Computer Vision and Image Understanding*, vol. 113, Issue 4, 41 pp. (Apr. 2009).

Amayeh et al., "Hand-Based Verification Using Palm-Finger Segmentation," 30 pp. (May 2006).

Amayeh et al., "Improving Hand-Based Verification Through Online Finger Template Update Based on Fused Confidences," *IEEE Int'l Conf. on Biometrics: Theory, Applications and Systems*, 6 pp. (2009).

Amayeh et al., "Peg-Free Hand Shape Verification Using High Order Zernike Moments," *IEEE Workshop on Multi-modal Biometrics*, 8 pp. (Jun. 2006).

Belkasim et al., "Efficient Algorithm for Fast Computation of Zernike Moments," *IEEE Symp. on Circuits and Systems*, vol. 3, pp. 1401-1404 (Aug. 1996).

Bulatov et al., "Hand Recognition Using Geometric Classifiers," *Int'l Conf. on Biometric Authentication*, pp. 753-759 (Jul. 2004).

Cheung et al., "A Two-Level Fusion Approach to Multimodal Biometric Verification," *IEEE Int'l Conf. on Acoustics, Speech, and Signal Processing*, vol. 5, pp. 485-488 (Mar. 2005).

Erol et al., "Visual Hull Construction Using Adaptive Sampling," *IEEE Workshop on Applications of Computer Vision*, 8 pp. (Jan. 2005).

"The GNU Multiple Precision Arithmetic Library," Edition 5.0.1, 144 pp. (Feb. 6, 2010).

Gu et al., "A Novel Algorithm for Fast Computation of Zernike Moments," *Pattern Recognition*, vol. 35, pp. 2905-2911 (2002).

Heisele, "Visual Object Recognition with Supervised Learning," *IEEE Intelligent Systems*, pp. 38-42 (May/Jun. 2003).

Ingersoll-Rand, plc, printouts from World Wide Web, 5 pages (downloaded Mar. 11, 2011).

Jain et al., "A Prototype Hand Geometry-based Verification System," *Proc. 2nd Int'l Conf. on Audio- and Video-Based Personal Authentication*, pp. 166-171 (Mar. 1999).

Jain et al., "Deformable Matching of Hand Shapes for Verification," *Proc. IEEE Int'l Conf. on Image Processing*, pp. 857-861 (Oct. 1999).

Jiang et al., "Information Fusion in Face and Fingerprint Identity Verification System," *3rd Int'l Conf. on Machine Learning and Cybernetics*, pp. 3529-3535 (Aug. 2004).

Jiang et al., "Online Fingerprint Template Improvement," *IEEE Trans. on Pattern Analysis and Machine Intelligence*, vol. 24, No. 8, pp. 1121-1126 (Aug. 2002).

Khotanzad et al., "Invariant Image Recognition by Zernike Moments," *IEEE Trans. on Pattern Analysis and Machine Intelligence*, vol. 12, pp. 489-498 (1990).

Kittler et al., "On Combining Classifiers," *IEEE Trans. on Pattern Analysis and Machine Intelligence*, vol. 20, pp. 226-239 (1998).

Kumar et al., "Personal Recognition Using Hand Shape and Texture," *IEEE Trans. on Image Processing*, vol. 15, pp. 2454-2461 (Aug. 2006).

Kumar et al., "Personal Verification using Palmprint and Hand Geometry Biometric," *Time-Varying Image Processing and Moving Object Recognition*, pp. 668-678 (Jun. 2003).

Lay, "Hand Shape Recognition," *Optics and Laser Technology*, vol. 32, pp. 1-5 (Feb. 2000).

Liao et al., "On the Accuracy of Zernike Moments for Image Analysis," *IEEE Trans. on Pattern Analysis and Machine Intelligence*, vol. 20, No. 12, pp. 1358-1364 (Dec. 1998).

Liu et al., "Eigenspace Updating for Non-stationary Process and its Application to Face Recognition," *Pattern Recognition*, pp. 1945-1959 (2003).

Ma et al., "Using B-Spline Curves for Hand Recognition," *Proc. 17th Int'l Conf. on Pattern Recognition*, vol. 3, pp. 274-277 (Aug. 2004).

Mohan et al., "Example-Based Object Detection in Images by Components," *IEEE Trans. on Pattern Analysis and Machine Intelligence*, vol. 23, No. 4, pp. 349-361 (Apr. 2001).

Mukundan et al., "Fast Computation of Legendre and Zernike Moments," *Pattern Recognition*, vol. 28, No. 9, pp. 1433-1442 (1995).

Oden et al., "Combining Implicit Polynomials and Geometric Features for Hand Recognition," *Pattern Recognition Letters*, vol. 24, No. 13, pp. 2145-2152 (2003).

Osuna et al., "An Improved Training Algorithm for Support Vector Machines," *Proc. Neural Networks in Signal Processing*, 10 pp. (1997).

Phillips et al., "The FERET Evaluation Methodology for Face-Recognition Algorithms,", *IEEE Trans. on Pattern Analysis and Machine Intelligence*, vol. 22, No. 10, pp. 1090-1104 (Oct. 2000).

Prokop et al., "A Survey of Moment Based Techniques for Unoccluded Object Representation," *Graph. Models Image Process*, vol. 54, No. 5, pp. 438-460 (1992).

Rattani et al., "Biometric Template Update Using the Graph Mincut Algorithm: A Case Study in Face Verification," $6^{th}$ *IEEE Biometrics Symposium*, pp. 23-28 (2008).

Ribaric et al., "Multimodal Biometric User-Identification System for Network-Based Applications," *IEE Proc. on Vision, Image and Signal Processing*, vol. 150, pp. 409-416 (Dec. 2003).

Roli et al., "Semi-supervised PCA-based Face Recognition Using Self Training," *Int'l Workshop on Structural, Syntactic and Statistical Pattern Recognition*, pp. 560-568 (2006).

Ross et al., "Feature Level Fusion Using Hand and Face Biometrics," *SPIE Conf. on Biometrics Technology for Human Identification*, vol. 5779, No. 2, pp. 196-204 (Mar. 2005).

Ross et al., "Information Fusion in Biometrics," *Pattern Recognition Letters*, vol. 24, No. 13, pp. 2115-2125 (Sep. 2003).

(56) References Cited

OTHER PUBLICATIONS

Ryu et al., "Template Adaptation Based Fingerprint Verification," *The 18th Int'l Conf. on Pattern Recognition*, vol. 4, pp. 582-585 (2006).

Sanchez-Reillo et al., "Biometric Identification Through Hand Geometry Measurements," *IEEE Trans. on Pattern Analysis and Machine Intelligence*, vol. 22, No. 10, pp. 1168-1171 (Oct. 2000).

Sanchez-Reillo, "Hand Geometry Pattern Recognition Through Gaussian Mixture Modelling," *15th Int'l Conf. on Pattern Recognition*, vol. 2, pp. 937-940 (2000).

Schneiderman et al., "Object Detection Using the Statistics of Parts," *Int'l Journal of Computer Vision*, vol. 56, No. 3, pp. 151-177 (2004).

Sun et al., "Object Detection Using Feature Subset Selection," *Pattern Recognition*, vol. 37, pp. 2165-2176 (2004).

Tavakkoli et al., "Incremental SVDD Training: Improving Efficiency of Background Modeling in Videos," *Signal and Image Processing*, 6 pp. (2008).

Tax et al., "Support Vector Data Description," *Machine Learning*, vol. 54, No. 1, pp. 45-66 (2004).

Teague, "Image Analysis Via the General Theory of Moments," *J. Opt. Soc. Am.*, vol. 70, Issue 8, pp. 920-930 (1980).

Teh et al., "On Image Analysis by the Methods of Moments," *IEEE Trans. on Image Analysis and Machine Intelligence*, vol. 10, No. 4, pp. 496-513 (1988).

Uludag et al., "Biometric Template Selection and Update: a Case Study in Fingerprints," *Pattern Recognition*, vol. 37, pp. 1533-1542 (2003).

Wong et al., "Peg-Free Hand Geometry Recognition Using Hierarchical Geometry and Shape Matching," *IAPR Workshop on Machine Vision Applications*, pp. 281-284 (2002).

Woodard et al., "Finger Surface as a Biometric Identifier," *Computer Vision and Image Understanding*, vol. 100, pp. 357-384 (2005).

Woodard et al., "Personal Identification Utilizing Finger Surface Features," *IEEE Conf. on Computer Vision and Pattern Recognition*, vol. 2, pp. 1030-1036 (Jun. 2005).

Xiong et al., "Peg-Free Human Hand Shape Analysis and Recognition," *Proc. IEEE Int'l Conf. on Acoustics, Speech, and Signal Processing*, vol. 2, pp. 77-80 (Mar. 2005).

Yoruk et al., "Shape-Based Hand Recognition," *IEEE Trans. on Image Processing*, vol. 15, No. 7, pp. 1803-1815 (Jul. 2006).

Non-Final Office Action dated Sep. 14, 2010, in pending U.S. Appl. No. 11/820,474.

Final Office Action dated Aug. 1, 2011, in pending U.S. Appl. No. 11/820,474.

Non-Final Office Action dated Jul. 22, 2013, in pending U.S. Appl. No. 11/820,474.

Xiao-yong et al, "Multibiometrics based on Palmpring and Handgeometry", 2005, IEEE, pp. 1-5.

\* cited by examiner (a)

$$Z_{0,0} = \beta_{0,0,0}X_{0,0}$$

$$Z_{2,0} = \beta_{2,0,0}X_{0,0} + \beta_{2,0,2}X_{0,2}$$

$$Z_{4,0} = \beta_{4,0,0}X_{0,0} + \beta_{4,0,2}X_{0,2} + \beta_{4,0,4}X_{0,4}$$

$$Z_{6,0} = \beta_{6,0,0}X_{0,0} + \beta_{6,0,2}X_{0,2} + \beta_{6,0,4}X_{0,4} + \beta_{6,0,6}X_{0,6}$$

$$Z_{8,0} = \beta_{8,0,0}X_{0,0} + \beta_{8,0,2}X_{0,2} + \beta_{8,0,4}X_{0,4} + \beta_{8,0,6}X_{0,6} + \beta_{8,0,8}X_{0,8}$$

$$Z_{10,0} = \beta_{10,0,0}X_{0,0} + \beta_{10,0,2}X_{0,2} + \beta_{10,0,4}X_{0,4} + \beta_{10,0,6}X_{0,6} + \beta_{10,0,8}X_{0,8} + \beta_{10,0,10}X_{0,10}$$

(a)

(b)

(a)

(b)

HAND-BASED GENDER CLASSIFICATION

CROSS-REFERENCE TO RELATED APPLICATION

This application claims the benefit of U.S. Provisional Application No. 61/219,749, filed Jun. 23, 2009 and entitled "HAND-BASED GENDER CLASSIFICATION", which application is hereby incorporated by reference for all that it discloses.

BACKGROUND

Gender classification is a problem with a variety of practical applications. Face authentication and recognition systems are discussed, generally, by K. Veropoulos, G. Bebis, and M. Webster in "Investigating the impact of face categorization on recognition performance", International Symposium on Visual Computing (LNCS, vol 3804), December, 2005.

In computer vision, the majority of studies on gender classification are based on face, because visual information from human faces provides important cues for gender classification. A recent study comparing different gender classification approaches using face information was reported by E. Makinen and R. Raisamo in "Evaluation of gender classification methods with automatically detected and aligned faces", IEEE Transactions on Pattern Analysis and Machine Intelligence, volume 30(3), pages 541-547, 2008. A very small number of studies have also investigated the use of modalities other than face, including gait, iris and fingerprint. For example, gait was investigated by C. Shan, S. Gong, and P. W. McOwan in "Learning gender from human gaits and faces", IEEE Conference on Advanced Video and Signal Based Surveillance, pages 505-510, September 2007. Iris was investigated by V. Thomas, N. V. Chawla, K. W. Bowyer, and P. J. Flynn in "Learning to predict gender from iris images", IEEE International Conference on Biometrics: Theory, Applications, and Systems, pages 1-5, September 2007. Fingerprint was investigated by A. Badawi, M. Mahfouz, R. Tadross, and R. Jantz in "Fingerprint-based gender classification", The International Conference on Image Processing, Computer Vision, and Pattern Recognition, June 2006.

SUMMARY

Many of the methods, systems and modules described herein are directed toward classifying the gender of a subject to whom a hand belongs (sometimes referred to herein as determining the gender of the hand, for brevity). However, this should not be read as a requirement of all implementations of the techniques and systems described herein. That is, many of the methods, systems and modules described herein may be applied to, or operate on, images other than hand or hand part images. At least some of the methods, systems and modules may also be used for purposes other than gender classification. That said, at least some implementations of the methods, systems and modules described herein can be used to classify the gender of a hand. In these implementations, each of at least one part of the hand is represented by a digital image. For each of the at least one digitally-imaged hand part, a set of feature parameters representing a geometry of the digitally-imaged hand part is computed. The set(s) of feature parameters for a set of one or more of the digitally-imaged hand parts are used to compute a similarity of the set of digitally-imaged hand parts to each of i) a first model space corresponding to a male class, and ii) a second model space corresponding to a female class. The computed similarities are used to classify the gender of the hand as belonging to the male class or the female class.

In some implementations, the first and second model spaces may be first and second eigenspaces. In these implementations, the similarity of the set of digitally-imaged hand parts to each eigenspace may be computed as a distance of the set of digitally-imaged hand parts from each eigenspace, and the gender of the hand may be classified based on these distances. Alternately, the model spaces may take other computer-representable forms.

In some embodiments, the methods, systems and modules that classify the gender of a hand may first acquire a digital image of the hand, and then segment the digital image into digitally-imaged hand parts. In some examples, the digitally-imaged hand parts may include one or more finger parts (such as five finger parts) and a palm part. Alternately, or additionally, the digitally-imaged hand parts may include other types of parts, such as parts that do not correspond to any particular finger or the palm, or parts formed from combinations of fingers (or from finger/palm combinations).

The sets of feature parameters may take various forms, including those of contour-based feature parameters, such as Zernike moments, or region-based feature parameters, such as Fourier descriptors. In some embodiments, Principal Component Analysis can be used to reduce the dimensionality of the sets of feature parameters.

The computed distances between a set of digitally-imaged hand parts and each of male and female eigenspaces can be used to classify the gender of a hand in different ways. For example, the gender of the hand can be classified as belonging to the class to which the set of digitally-imaged hand parts is closest. Or, for example, a distance vector can be formed from the computed distances, and the distance vector can be compared to each of k-nearest neighbor distance vectors in a set of training data. The gender of the hand can then be classified as belonging to the class that corresponds to a majority of the k-nearest neighbor distance vectors in the set of training data.

In still another implementation, the computed distances for a set of digitally-imaged hand parts can be combined into a classification score, and the gender of the hand can be classified by comparing i) the classification score to ii) a threshold computed from a set of training data. In some embodiments, Linear Discriminant Analysis (LDA) can be used to compute and classify classification scores.

Some of the methods, systems and modules disclosed herein may employ different types of fusion, such as feature-level fusion, score-level fusion, or decision-level fusion.

Briefly, feature-level fusion fuses sets of feature parameters into feature vectors that represent multiple hand parts. Feature-level fusion can also fuse or combine distance vectors representing multiple hand parts.

Score-level fusion can be used to fuse or combine classification scores for different sets of digitally-imaged hand parts. For example, in some cases, each of the classification scores can be assigned a weight in accord with a weighting function, and the weighted classification scores are then combined into an overall score for a hand. The overall score can then be compared to a threshold to determine whether the hand should be classified as belonging to the male gender or the female gender.

Decision-level fusion can be used to combine classification decisions for sets of digitally-imaged hand parts. For example, each of a plurality of sets of hand parts may be classified, according to their gender. The gender of a hand may then be classified based on the gender classifications of the different sets of hand parts. In some cases, this can be done by majority vote.

Other implementations and embodiments are also disclosed, as shown in the drawings and discussed in the following description.

BRIEF DESCRIPTION OF THE DRAWINGS

Illustrative embodiments of the invention are illustrated in the drawings, in which:

FIG. 13 illustrates an example of common terms in a computation of Zernike moments;

DETAILED DESCRIPTION

The following description relates to examples of systems and methods for performing hand-based gender classification. As a result, much of the description herein is directed to processing and analyzing digital images of hands or hand parts. In some of the described embodiments, and by way of example, the hand parts are understood to be finger parts and palm parts (where, for purposes of this description, thumbs are considered fingers). However, this should not be read as a limitation on the techniques and systems described herein. Similarly, although many of the descriptions herein are directed toward classifying the gender of a subject to whom a hand belongs (sometimes referred to herein as determining the gender of the hand, for brevity), this should not be read as a requirement of all implementations of the techniques and systems described herein. That is, many of the methods, systems and modules described herein may be applied to, or operate on, images other than hand or hand part images. At least some of the methods, systems and modules may also be used for purposes other than gender classification.

Hand-based gender classification can provide many advantages. For example, images of hands can be captured more robustly than images of faces. That is, there are several biometric systems available today that can capture high quality hand images with relative ease. Also, assuming that a hand is placed on a flat surface for image acquisition purposes (which is typically the case in hand-based authentication applications), hand appearance shows less variability compared to face appearance (e.g., face appearance is affected by factors such as facial expression change, rest, hair growth and makeup).

Hand-based gender classification can be used solely for determining the gender of one or more subjects, or as a tool to improve other methods and systems. For example, a robust gender classification system could provide a basis for performing passive surveillance using demographic information, or a system for collecting valuable consumer statistics in a shopping center. It could also be used to improve the performance of other biometric systems, such as face-based authentication and identification/recognition systems.

In this description, a "digitally-imaged hand part" is a digital image of a part of a hand. In some cases, the "part" can be the entire hand. In this description, digitally-imaged hand parts are sometimes referred to more simply as "hand parts". However, it is understood that the methods, processes, systems and modules disclosed herein generally operate on digital images of hand parts.

Also in this description, the terms "method" and "process" are used interchangeably, and no difference in meaning is intended between these terms.

1. Examples of Methods for Classifying the Gender of a Hand

Figure 1A:
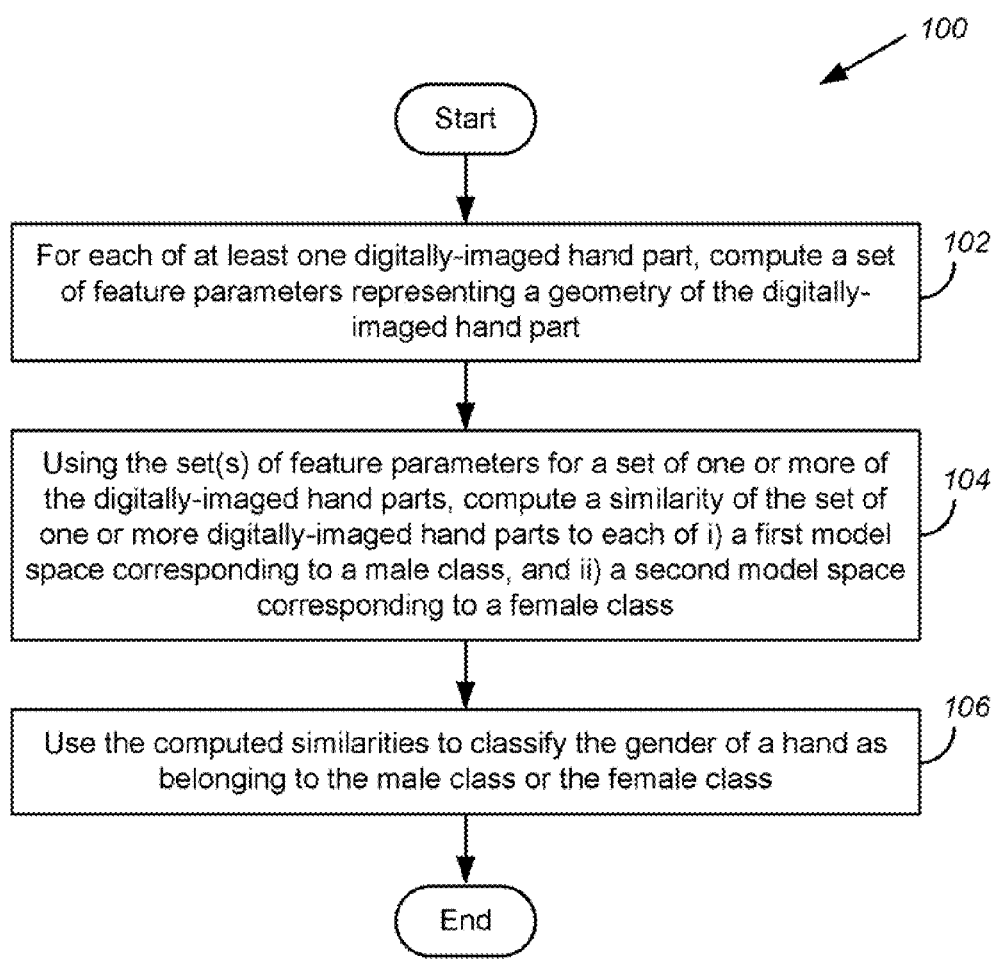
FIGS. 1(a) and 1(b) illustrate first and second examples of methods for classifying the gender of a hand.

FIG. 1(a) illustrates a first example of a method 100 for classifying the gender of a hand. The method 100 presumes that one or more parts of the hand (i.e., "hand parts") have already been digitally-imaged. The hand parts may comprise, for example, five finger parts (one of which can also be considered a thumb part) and a palm part. An example of a method for acquiring digital images of these hand parts will be discussed later in this description.

At block 102 of the method 100, and for each of at least one digitally-imaged hand part, a set of feature parameters representing a geometry of the digitally-imaged hand part is computed. This set of feature parameters is sometimes referred to herein as a "feature vector". By way of example, the computed feature parameters may comprise contour-based feature parameters, such as Zernike moments, or region-based feature parameters, such as Fourier descriptors.

At block 104 of the method 100, the set(s) of feature parameters for a set of one or more of the digitally-imaged hand parts are used to compute a similarity of the set of digitally-imaged hand parts to each of i) a first model space corresponding to a male class, and ii) a second model space corresponding to a female class.

At block 106 of the method 100, the similarities computed in block 104 are used to classify the hand as belonging to a male gender class (i.e., belonging to a male subject) or belonging to a female gender class (i.e., belonging to a female subject).

Figure 1B:
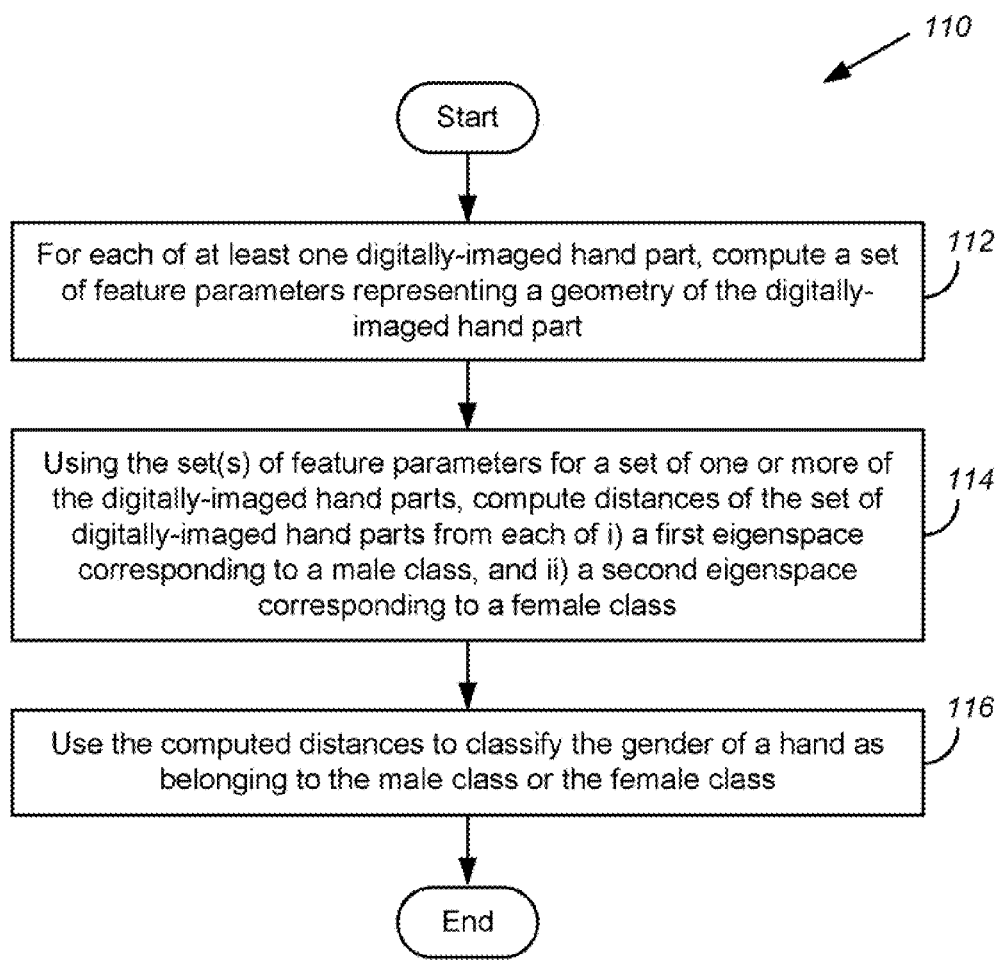

FIG. 1(b) illustrates a second example of a method 110 for classifying the gender of a hand. As with the method 100, the method 110 presumes that one or more parts of the hand have already been digitally-imaged.

At block 112 of the method 110, and for each of at least one digitally-imaged hand part, a set of feature parameters representing a geometry of the digitally-imaged hand part is computed. By way of example, the computed feature parameters may comprise contour-based feature parameters, such as Zernike moments, or region-based feature parameters, such as Fourier descriptors.

At block 114 of the method 110, the set(s) of feature parameters for a set of one or more of the digitally-imaged hand parts are used to compute distances of the set of digitally-imaged hand parts from each of i) a first eigenspace corresponding to a male class, and ii) a second eigenspace corresponding to a female class. Thus, in some cases, the distances may be computed for a single digitally-imaged hand part (e.g., a finger part or a palm part). In these cases, the first and second eigenspaces are formed for the appropriate one of the hand parts. In other cases, the distances may be computed for a set of multiple digitally-imaged hand parts (e.g., any two or more hand parts, or all of a hand's parts). In these cases, the sets of features for the multiple hand parts may be concatenated, and the first and second eigenspaces are formed for the appropriate combination of hand parts.

At block 116 of the method 110, the distances computed in block 114 are used to classify the hand as belonging to a male gender class (i.e., belonging to a male subject) or belonging to a female gender class (i.e., belonging to a female subject).

Figure 2:
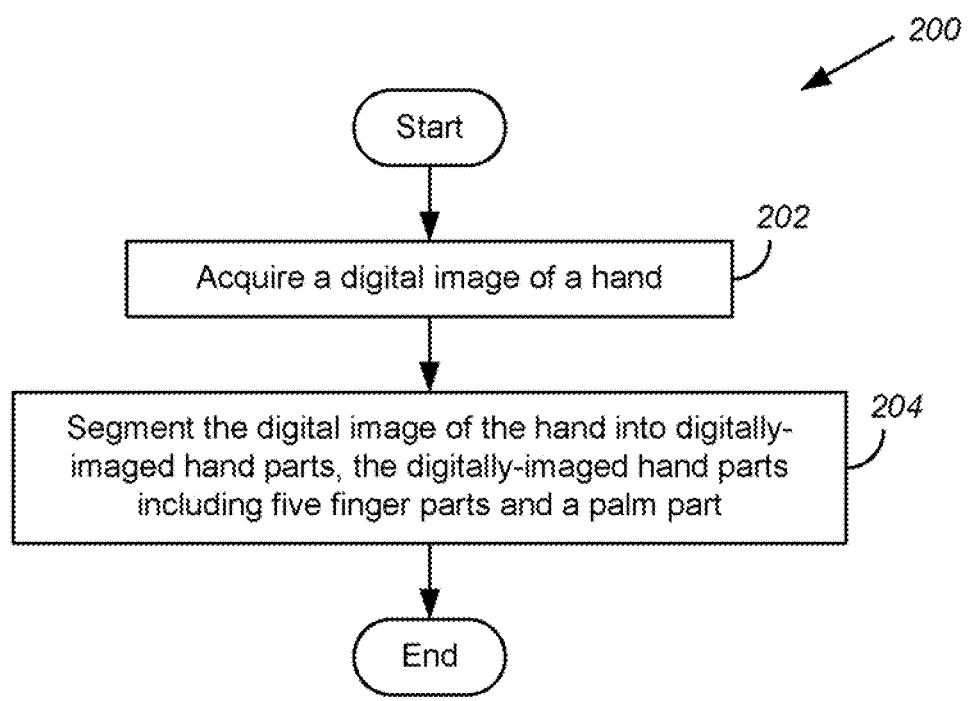
FIG. 2 illustrates an example of a method for generating the digitally-imaged hand parts accessed by the method shown in FIG. 1(a) or 1(b)

As previously mentioned, the methods 100, 110 shown in FIGS. 1(a) and 1(b) presume that one or more parts of a hand have already been digitally-imaged. However, in some embodiments of the methods 100, 110, this task may need to be performed. Furthermore, the manner or form in which digitally-imaged hand parts are generated can have a bearing on the correctness of gender classification. As a result, FIG. 2 illustrates an example of a method 200 for generating the digitally-imaged hand parts accessed by the methods 100, 110. In general, the method 200 comprises acquiring a digital image of a hand (at block 202). At block 204, the digital image of the hand is then segmented into digitally-imaged hand parts, including, for example, finger and palm parts. Examples of more detailed ways of performing these acquisition and segmentation methods will be discussed in greater detail later in this description.

It is noted that the various process blocks illustrated in FIGS. 1(a), 1(b) and 2 are presented by way of example only, and in various implementations, the illustrated process blocks may be merged, divided into sub-blocks, or omitted.

2. Example of a System for Classifying the Gender of a Hand

Figure 3:
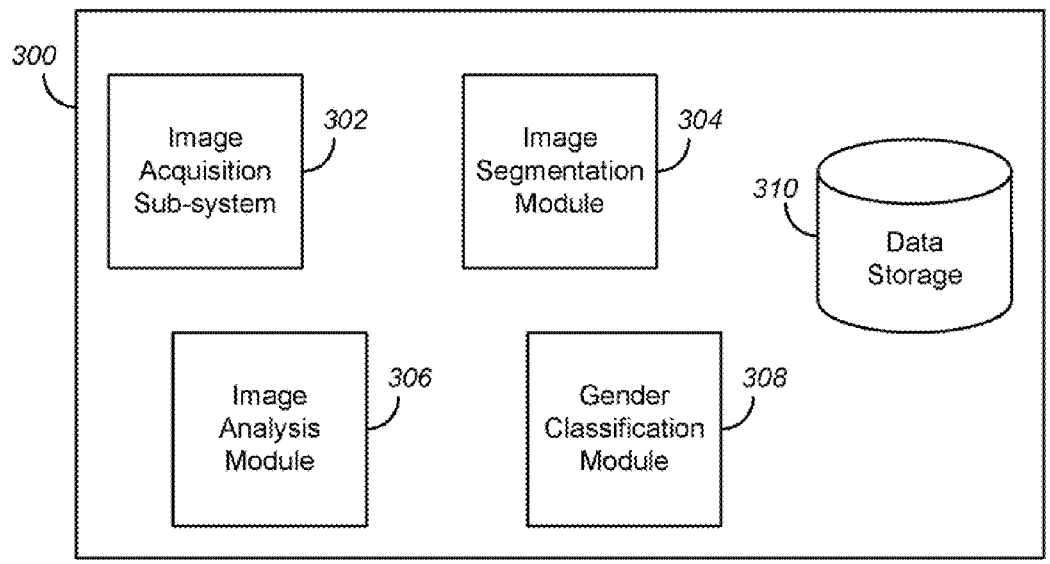
FIG. 3 illustrates a first example of a system for performing the method shown in FIG. 1(a) or 1(b) (or other methods)

In some implementations, the methods shown in FIGS. 1(a), 1(b) and 2 may be performed by the system 300 shown in FIG. 3. By way of example, the system 300 comprises an image acquisition sub-system 302, an image segmentation module 304, an image analysis module 306, a gender classification module 308, and data storage 310. Each of the methods shown in FIGS. 1(a), 1(b) and 2 may be performed by, or with the aid of, software or hardware provided by one or more of the sub-system 302, the modules 304, 306, 308, or the data storage 310.

By way of example, and in some embodiments, the feature parameter and distance computations performed at the process blocks 102 and 104 of FIG. 1(a), or the process blocks 112 and 114 of FIG. 1(b), are performed by, or with the aid of, the image analysis module 306. The gender classification performed by process blocks 106 or 116 can be performed by, or with the aid of, gender classification module 308. The image acquisition performed by process block 202 (FIG. 2) can be performed by, or with the aid of, image acquisition sub-system 302. The image segmentation performed by process block 204 can be performed by, or with the aid of, image segmentation module 304. The digital images, feature parameters, eigenspace definitions, computed distances, gender classifications and other information may be stored in the data storage 310. The data storage 310 comprises physical hardware, such as one or more hard disks, removable disks, or memories. Data can be stored in the data storage 310 in more-structured storage implementations, such as a database, or in less-structured storage implementations, such as a plurality of data values or files.

The image acquisition and segmentation processes performed by the blocks 202, 204 of the method 200 (FIG. 2) will now be described in further detail.

3. Example of a Method for Acquiring a Digital Image of a Hand

Figure 4:
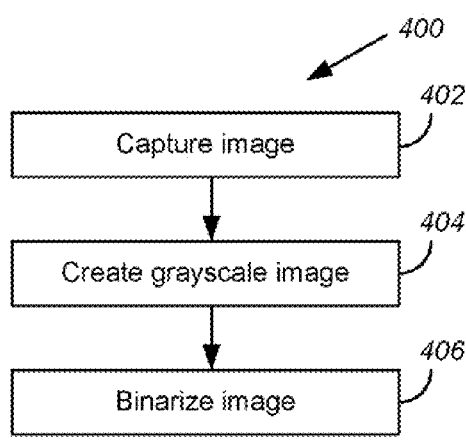
FIG. 4 illustrates an example of a method for acquiring a digital image of a hand, for segmentation into the digitally-imaged hand parts accessed by the method shown in FIG. 1(a) or 1(b)

FIG. 4 illustrates an example block diagram of a method 400 for acquiring a digital image of a hand, which method 400 may be performed by the image acquisition sub-system 302 of the system 300 (FIG. 3) when performing the process of block 202 (FIG. 2). The method begins at block 402, where a digital image of a hand is captured. One example of an image acquisition sub-system 302 according to the techniques described herein consists of a video graphics array resolution (VGA resolution) charge-coupled detector (CCD) camera, and a planar lighting table which provides the surface on which a hand is placed. An example of such a system 500 can be found in FIG. 5(a), in which the focal direction of the camera 502 is perpendicular to the lighting table 504. In some examples, the camera 502 is calibrated to remove lens distortion. In the illustrated implementation, the image obtained by the camera 502 is of the back of the hand being analyzed. In some applications, biometric analysis can be performed on such an image without the need to acquire an image of the front of the hand, or any particular lines or features of the palm or fingers. However, in alternative implementations, the image captured by the camera 502 (or an alternative camera or scanner) comprises, or is augmented with, biometric data such as finger or hand prints, as might be captured if a hand was placed palm-down on a scanner.

In alternative implementations, both the camera 502 and the lighting table 504 can be placed inside a box to more effectively eliminate the interference by light from a surrounding environment. However, the depicted implementation, especially when utilized alongside the gender classification techniques described herein, provides images of high-enough quality, without much effort to control light interference from the surrounding environment. That is, when a person places his/her hand on the surface of the lighting table 504, an almost binary, shadow and noise free, silhouette of the hand is obtained, as shown by the examples depicted in FIGS. 5(b) and 5(c).

Another alternative to the system 500 uses a flatbed scanner tuned to capture the hand silhouette. Yet another implementation processes the image through a threshold or filter, to create a silhouette with a more stark contrast from its background.

In further implementations of the system 500, the camera 502 is a video camera, such as a surveillance camera, or a still camera, such as a consumer or professional digital or film camera. When a film camera is used, a film image can be digitized using conventional techniques prior to further processing.

Figure 5:
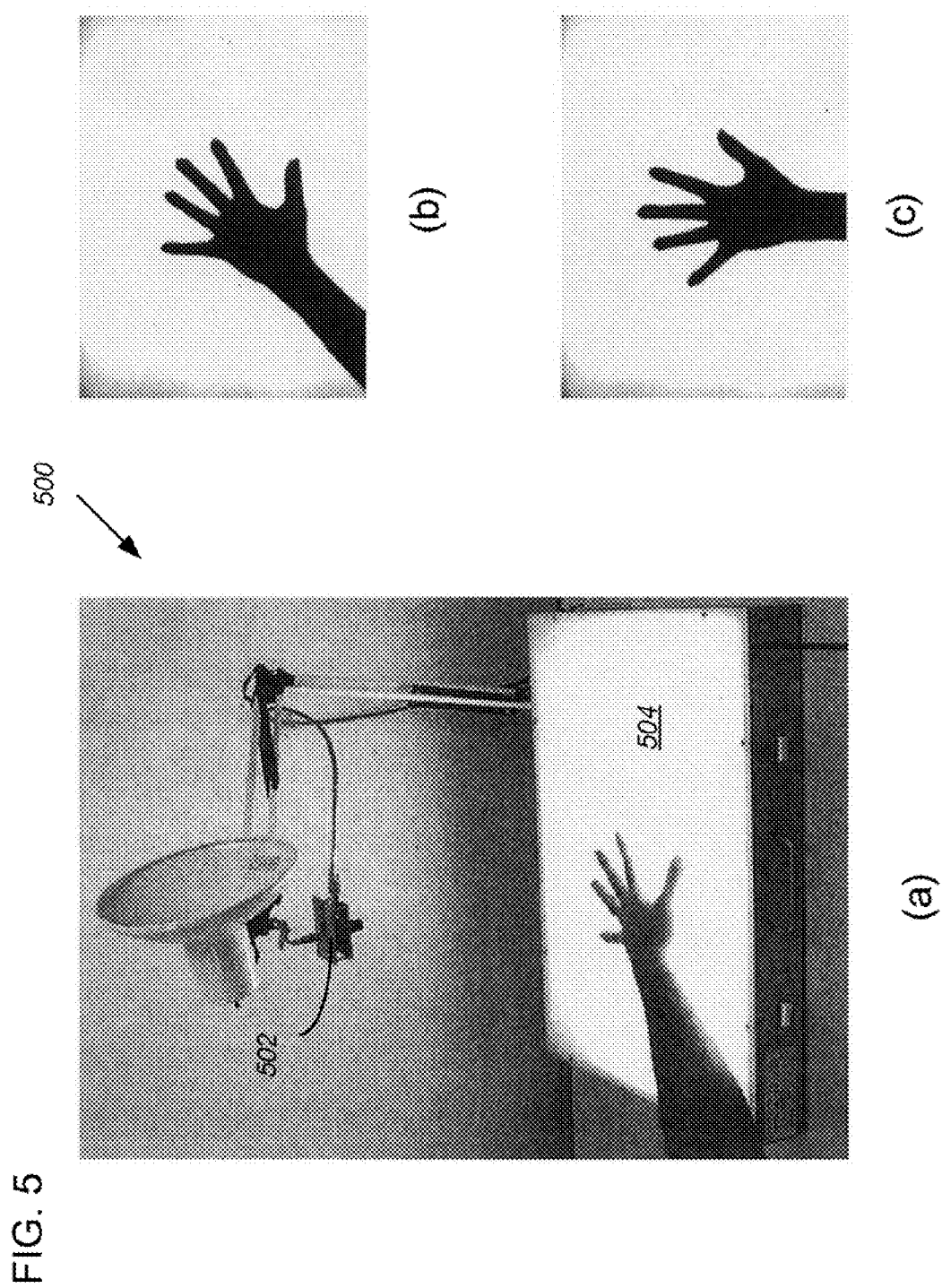
FIG. 5(a) illustrates an example of a system for acquiring a digital image of a hand.
FIGS. 5(b) and 5(c) illustrate examples of digital images acquired by the system shown in FIG. 5(a)

In one implementation, users are asked to stretch their hand during the acquisition process 202 (FIG. 2), and to place their hand inside a large rectangular region marked on the surface of the table 504 (FIG. 5). This facilitates visibility of the whole hand and avoids perspective distortions. However, in the illustrated implementation, there are no such limitations placed on the orientation of the hand.

In some implementations, an image of a hand can be captured using a gray scale camera; in other implementations, a color CCD camera can be used. In the latter implementations, the color image may be converted to a grayscale image in block 404. One implementation of such a conversion process uses the luminance values of pixels to obtain a grayscale image. For instance, luminance of a pixel (i,j) can be computed from the equation $Y_{i,j}=0.299R_{i,j}+0.587G_{i,j}+0.114B_{i,j}$, where $R_{i,j}$, $G_{i,j}$ and $B_{i,j}$ denote the respective red, green and blue (RGB) color values of a pixel.

At block 406 of the method 400, the grayscale image is binarized to create a binary image (e.g., an image containing only black and white pixels). The binary value $B_{i,j}$ of a pixel can be calculated as:

$$B_{i,j} = \begin{cases} 1 & \text{if } Y_{i,j} < T \\ 0 & \text{otherwise} \end{cases} \quad (1)$$

where T is a constant threshold. In one implementation, this threshold is determined experimentally. One example of a value for the threshold is T=0.5.

4. Example of a Method for Segmenting a Digital Image of a Hand into Digitally-Imaged Hand Parts After acquiring a digital image of a hand, the image segmentation module 304 (FIG. 3) can segment the image into hand and forearm parts, and then further segment the hand part into palm and finger parts.

In the examples discussed above, the binary silhouette (i.e., digital hand image) provided by the image acquisition sub-system 302 (FIG. 3) is a union of a hand and a forearm. The forearm, however, does not have as many distinctive features as the hand, and its silhouette at different acquisition sessions is not expected to be the same due to clothing and freedom in hand placement. Thus, the methods described below segment the forearm from the hand and do not use the image of the forearm.

To segment the forearm, one implementation utilizes an assumption that a user providing a hand image is not wearing very loose clothing on their forearm. Under this assumption, the palm can be identified as a thicker region of the silhouette, which enables the palm's detection through the finding of the largest circle inside the silhouette.

Examples of hand/forearm, palm/finger segmentation methods are summarized as follows. First, the forearm is separated from the hand by detecting the palm. This is done by finding the largest circle inside the hand/forearm silhouette. Then, the intersection of the forearm with the circle's boundary and image boundary is found to segment the hand from the forearm. In one implementation, in order to segment the fingers and the palm, the fingers are filtered out using morphological closing (provided by morphological filters). The fingers are then identified (and segmented) by subtracting the palm from the image of the entire hand. Finally, the finger segments are processed to remove artifacts of the segmentation process which could affect gender classification.

Figure 6:
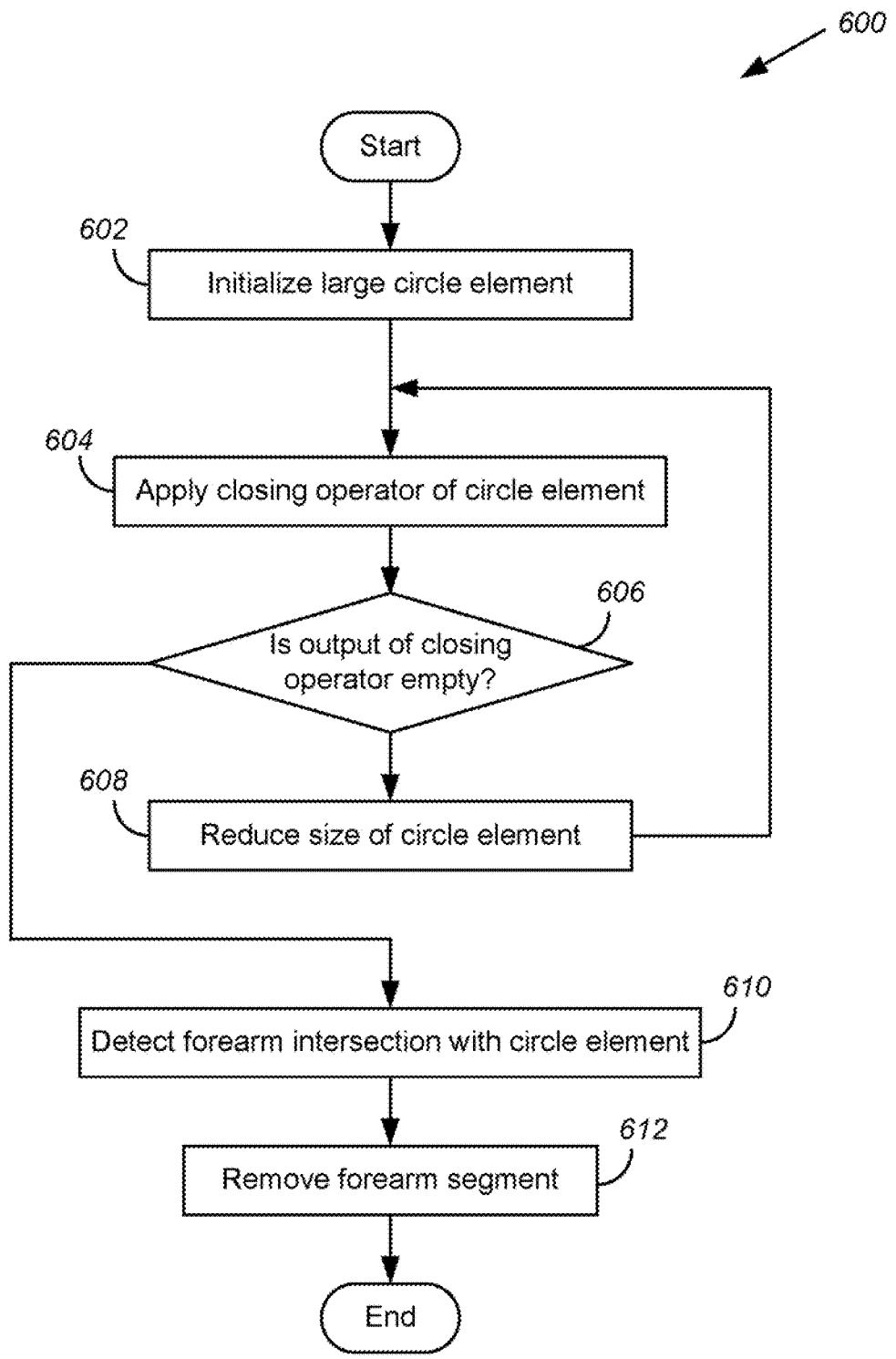
FIG. 6 illustrates an example of a method for segmenting a digital image into hand and forearm image segments.
Figure 7:
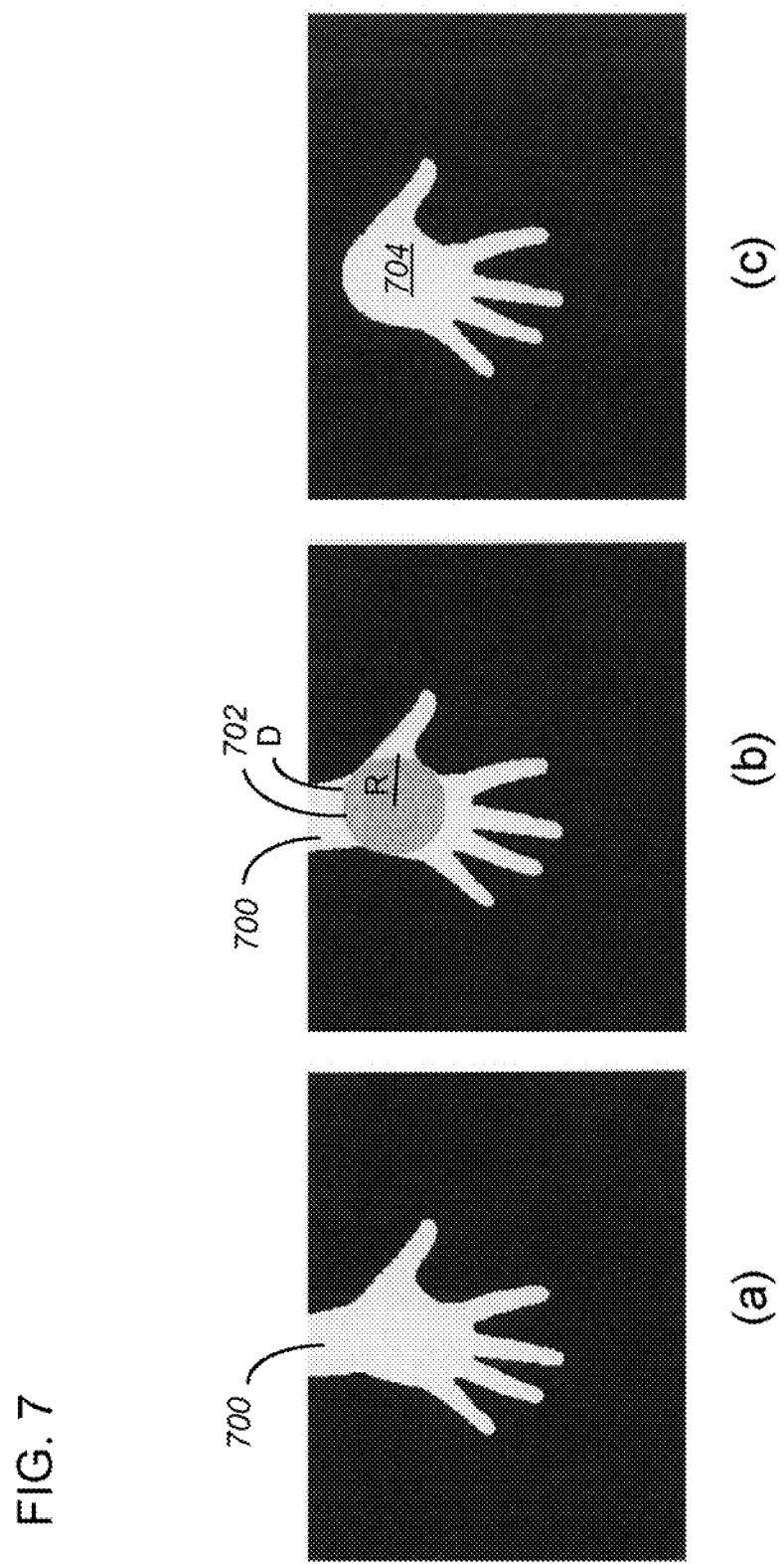
FIGS. 7(a), (b) and (c) illustrate examples of images corresponding to stages of the segmentation method shown in FIG. 6.
Figure 8:
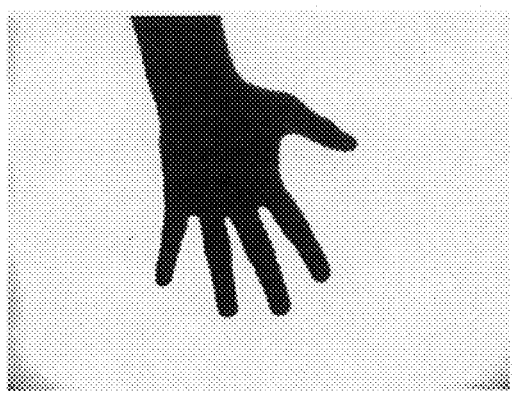
FIGS. 8(a), (b), (c) and (d) illustrate examples of finger movement observed in acquired digital images of a hand.
Figure 8:
Figure 8:
Figure 8:

FIG. 6 illustrates an example of a method 600 for segmenting the forearm from an acquired digital image of a hand. In various implementations, the illustrated process blocks of the method 600 may be merged, divided into sub-blocks, or omitted. The method begins at block 602, where the image segmentation module 304 (FIG. 3) initializes a circular structuring element D with a very large radius R. Next, at block 604, the module 304 applies a closing operator on the image using D. Then, at decision block 606, the module determines if the output is an empty image. If the output is empty, then at block 608, the size of the circle element is reduced (e.g., by setting R=R−1) and the method returns to block 604. If the circle is not empty, then the resulting image from the closing operator should be the largest circle inside the silhouette. An example of an image 700 that might be operated on by the method 600 is shown in FIG. 7(a), and an example of a largest circle 702 inside the image 700 is shown in FIG. 7(b). Once the largest circle is found, the forearm is segmented from the hand by detecting its intersection with the circle 702 and the boundary of the image 700 (at block 610). The forearm portion of the image can then be removed at block 612. FIG. 7(c) shows the digitally-imaged hand part 704 that results from discarding the forearm part.

Segmentation of finger and palm parts can also be useful to obtain an accurate gender classification. To support accurate image capture and analysis, it is desirable for the fingers of a hand image to be separated from one another. However, differences in finger spacing will often exist. An example of hand images collected from the same person, shown in FIGS. 8(a)-8(d), illustrates this. As can be seen, the angles between fingers can change significantly between different samples. And, while the feature parameters disclosed herein for representing the geometry of a hand part can tolerate finger motion to some degree, the methods disclosed herein can often deal with larger variances in finger placement by segmenting the fingers from the palm of the hand, and by processing each hand part separately. Also, by providing multiple groups of feature parameters, segmentation can enable more focused optimization of gender classification processes (such as, by enabling the selection of different orders of Zernike moments for different segments, as will be described later in this description). This can sometimes increase gender classification accuracy.

Figure 9:
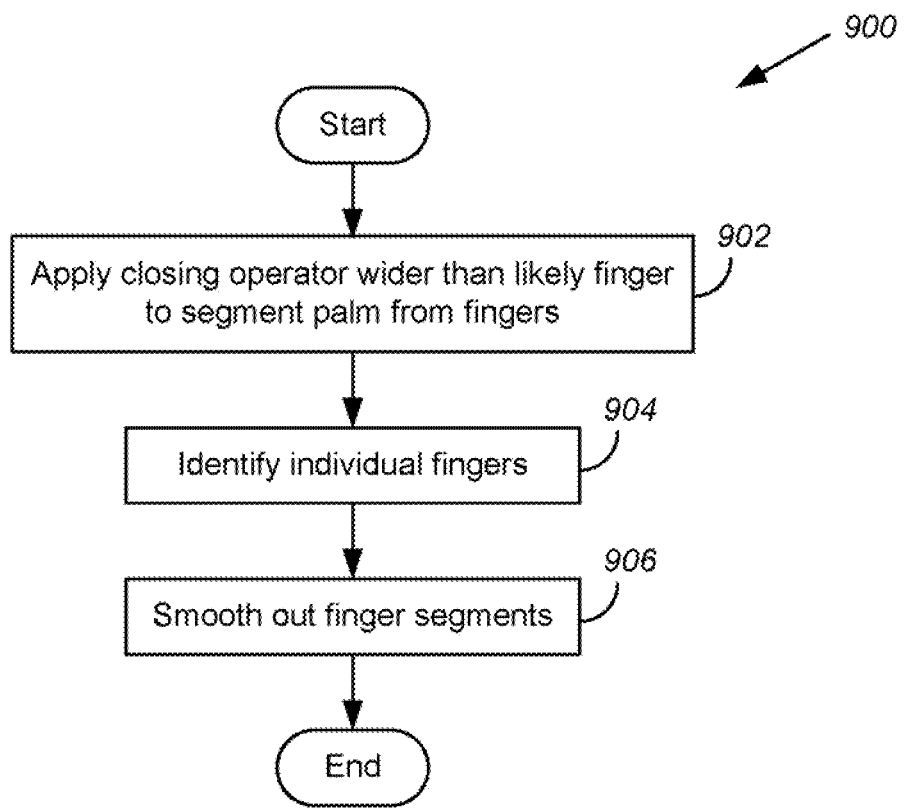
FIG. 9 illustrates an example of a method for segmenting a digital image of a hand into finger and palm image segments.

One example of a method 900 for segmenting a palm from its fingers is shown in FIG. 9. The method 900 comprises first applying a morphological closing operation based on a circular disk to an input hand image. This is shown at block 902, and in FIG. 10(a). In one implementation of the operation, the radius of the structuring element is set to 25 pixels (i.e., making it thicker than a typical widest finger found in an example database of examples). This closing operation filters out the fingers from the silhouette shown in FIG. 7(a), as shown in FIGS. 7(b) and 7(c). The remaining part of the silhouette (e.g. FIG. 7(c)) corresponds to the palm, which is then subtracted from the input image shown in FIG. 7(a) to obtain the fingers, as shown in block 904 of the method 900, and in FIG. 7(d). In another technique, the fingers can be segmented from the palm by detecting landmark points on the hand (e.g., fingertips and valleys), such as is performed in some traditional hand-based verification techniques. In yet another technique, the fingers can be individually identified using connected components analysis.

Figure 10:
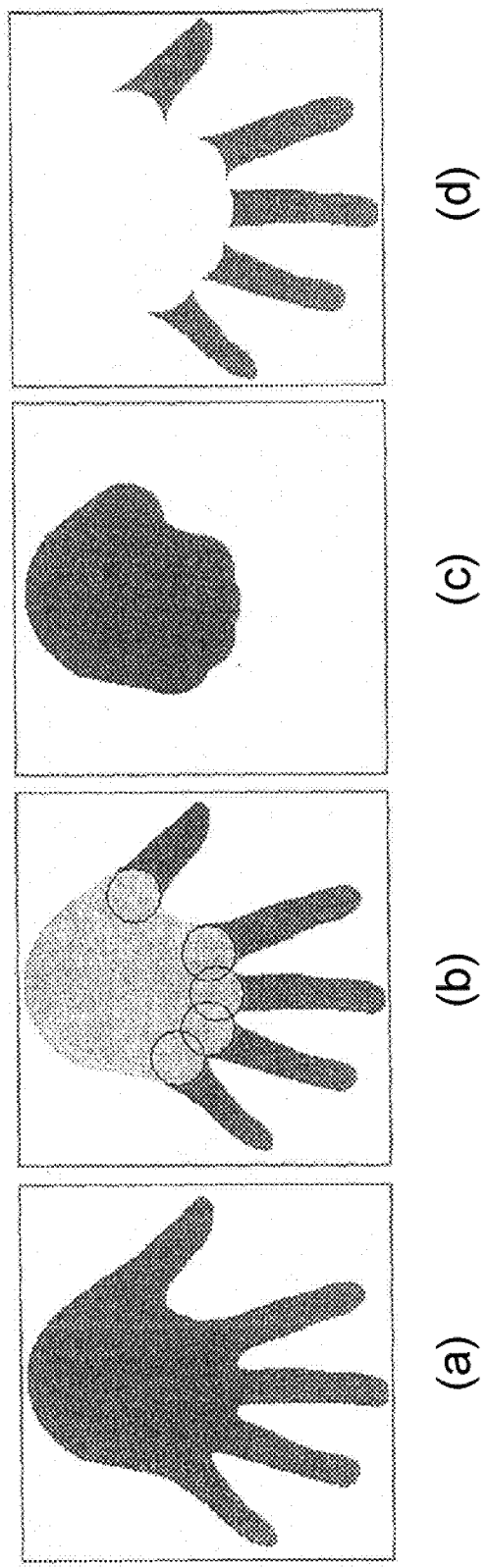
FIGS. 10(a), (b), (c) and (d) illustrate examples of images corresponding to stages of the segmentation method shown in FIG. 9.
Figure 11:
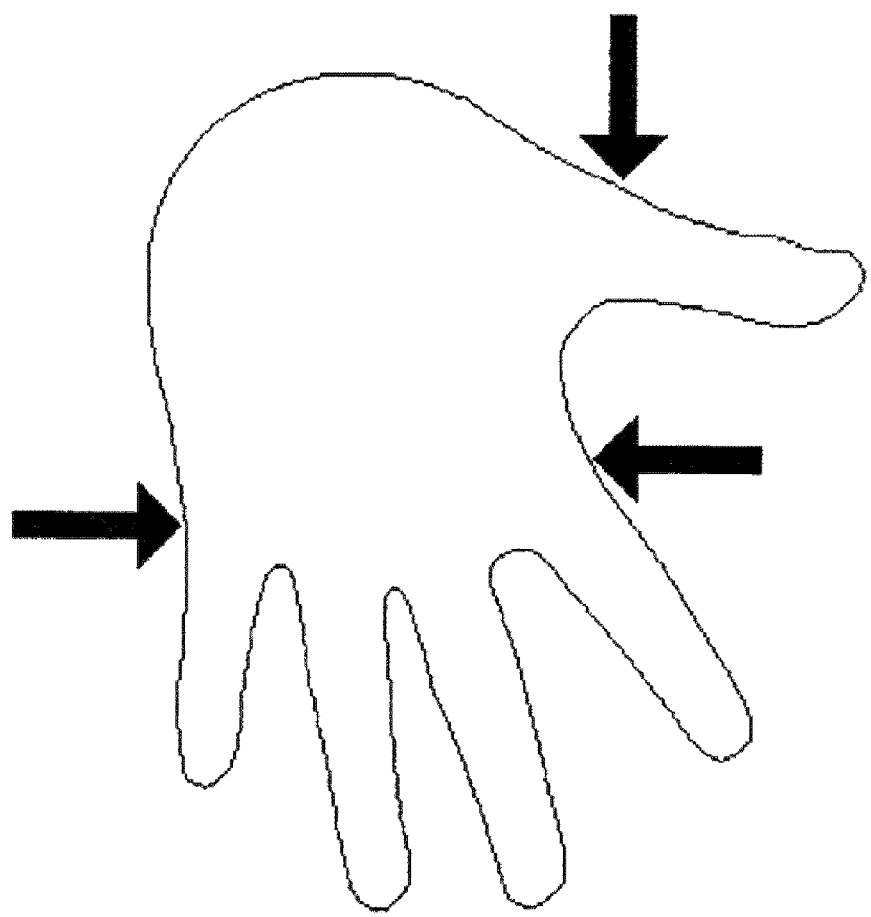
FIG. 11 illustrates examples of points on a hand where smoothing of finger image segments can be desirable.

As FIG. 10(d) illustrates, segmented fingers can have sharp tails at the locations where they previously met the palm. The tails can be particularly pronounced for the little, point and thumb fingers, because the curvature of the hand contour is less severe at the points where these fingers meet the palm (e.g., at the points shown in FIG. 11). Examples of more pronounced tails are shown in greater detail in FIG. 12(a). In some cases, and especially when a hand is small, there are significant differences in the lengths of the tails at each side of a finger. These tail differences can make accurate and efficient computation of feature parameters more difficult.

Figure 12:
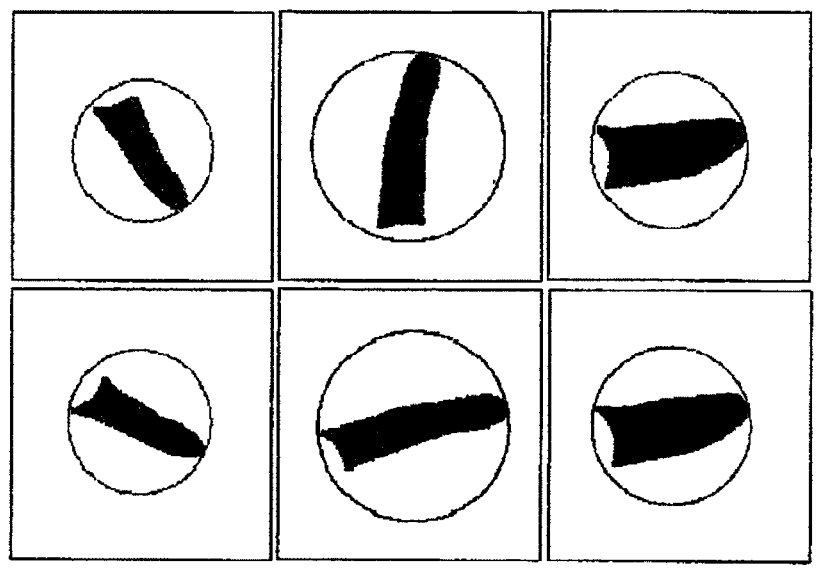
FIGS. 12(a) and (b) illustrate examples of finger image segments, before (FIG. 5(a)) and after (FIG. 5(b)) being smoothed.
Figure 12:
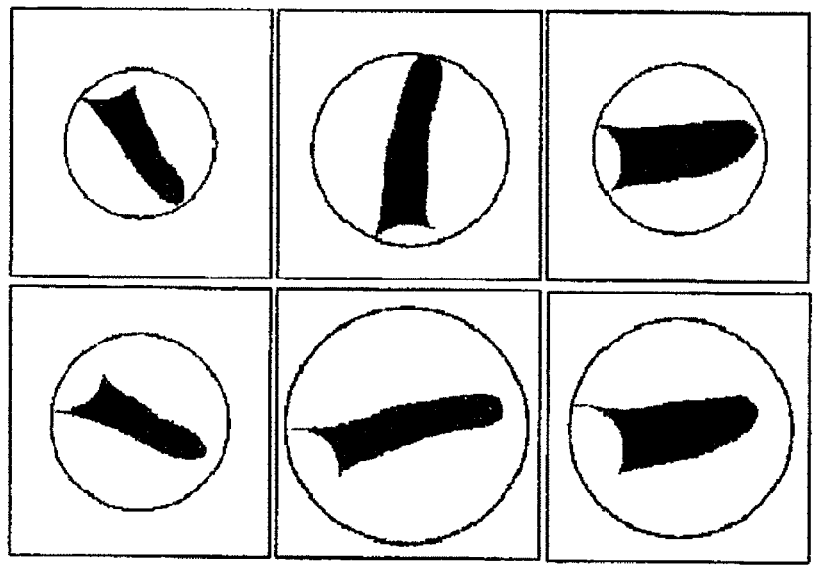

To remove the tails shown in FIG. 12(a), thus facilitating better computation of feature parameters representing the geometries of these fingers, and providing for better classification results, the method of FIG. 9 continues at block 906, where the tails of segmented fingers are smoothed out by applying an extra morphological closing step. In one implementation, this closing step is performed with a simple 4 by 4 square, with values set to one. The benefit of such processing can be observed by comparing the finger images shown in FIG. 12(a) to the finger images shown in FIG. 12(b). The smaller circles that enclose the fingers shown in FIG. 12(b) show the amount of tail reduction that can be achieved during the extra morphological closing step. Additional benefits of this smoothing step can be seen in the following Table, which illustrates the effect of this method by showing the normalized distances between the circles surrounding pairs of corresponding fingers in FIGS. 12(a) and 12(b):

| Finger: | $d_{before}$ | $d_{after}$ |
|---|---|---|
| Little | 0.5904 | 0.0901 |
| Point | 0.7881 | 0.1135 |
| Thumb | 0.7424 | 0.1253 |

5. Computation of Feature Parameters

Once a hand silhouette has been segmented into different regions or parts (i.e., "hand parts"), a set of feature parameters representing the geometry of each part is computed. See, for example, process block 102 in FIG. 1(a), or the process block 112 in FIG. 1(b).

Many shape descriptors or "feature parameters" are available for representing the geometry of a hand part. Following, and by way of example, two different types of MPEG-7 shape descriptors are discussed. Each of these shape descriptors can be used to represent the geometry of a finger or palm of a hand.

MPEG-7 divides shape descriptors into two categories: contour-based and region-based. Contour-based shape descriptors use a shape's boundary to extract shape/geometry information, while region-based shape descriptors exploit the shape's region to represent shape information. Zernike moments (an example of contour-based feature parameters) and Fourier descriptors (an example of region-based feature parameters) are both discussed in the MPEG-7 standard and below. These MPEG-7 shape descriptors are also discussed by D. Zhang and G. Lu in "Evaluation of mpeg-7 shape descriptors against other shape descriptors", Multimedia Systems, volume 9(1), pages 15-30, 2003, which is hereby incorporated by reference for all that it discloses, to the extent not inconsistent with the present disclosure.

5a. Examples of Zernike Moment Computation

In various implementations, once various segments or hand parts have been segmented from a hand silhouette, Zernike moments are computed for each of the hand parts. The Zernike moments for a particular hand part provide a set of feature parameters for the particular hand part. As will be discussed later in this description, sets of feature parameters can be used individually, to separately classify each hand part, or in fused or concatenated combinations, to classify sets composed of multiple hand parts.

Generally, Zernike moments are based on sets of complex polynomials that form a complete orthogonal set over the interior of the unit circle. See, for example, the paper published by A. Khotanzad and Y. Hong in "Invariant image recognition by zernike moments", IEEE Transactions on Pattern Analysis and Machine Intelligence, 12:489-498, 1990, which paper is hereby incorporated by reference for all that it discloses, to the extent not inconsistent with the present disclosure. A Zernike moment for an image is defined as the projection of the image on these orthogonal basis functions. Specifically, the basis functions $V_{n,m}(x,y)$ are given by:

$$V_{n,m}(x,y) = V_{n,m}(\rho,\theta) = R_{n,m}(\rho)e^{jm\theta} \quad (2)$$

where n is a non-negative integer known as the "order" of the Zernike moment resulting from these functions. Additionally, in the implementation given as equation (2), $j=\sqrt{-1}$; m is a nonzero integer subject to the constraints that n−|m| is even and |m|<n; ρ is the length of the vector from origin to (x,y); θ is the angle between the vector ρ and the x-axis in a counter clockwise direction; and $R_{n,m}(\rho)$ is what is known as a Zernike radial polynomial. $R_{n,m}(\rho)$ is defined as follows:

$$R_{n,m}(\rho) = \sum_{k=|m|\,n-k=even}^{n} \frac{(-1)^{\frac{n-k}{2}}\left(\frac{n+k}{2}\right)!}{\left(\frac{n-k}{2}\right)!\left(\frac{k+m}{2}\right)!\left(\frac{k-m}{2}\right)!}\rho^k \quad (3)$$

which is denoted, for the sake of simplicity of terminology, as:

$$R_{n,m}(\rho) = \sum_{k=|m|\,n-k=even}^{n} \beta_{n,m,k}\rho^k \quad (4)$$

From this definition, it follows that $R_{n,m}(\rho)=R_{n,-m}(\rho)$, and from the orthogonality of the basis functions $V_{n,m}(x,y)$, the following holds:

$$\frac{n+1}{\pi}\int\int_{x^2,y^2\leq 1} V_{n,m}(x,y)V^*_{p,q}(x,y) = \delta_{n,p}\delta_{m,q} \quad (5)$$

where $$\delta_{a,b} = \begin{cases} 1 & \text{if } a=b \\ 0 & \text{otherwise} \end{cases} \quad (6)$$

It is this orthogonality that, in part, allows the Zernike functions to provide a useful basis for an image function.

For a digital image defined by a digital image function $f(x,y)$, then, the Zernike moment of order n, with repetition, is given by:

$$Z_{n,m} = \frac{n+1}{\pi}\sum\sum_{x^2+y^2\leq 1} f(x,y)V^*_{n,m}(x,y) \quad (7)$$

where $V_{n,m}*(x,y)$ is the complex conjugate of $V_{n,m}(x,y)$. In some of the examples described herein, the digital image function $f(x,y)$ need only describe, for each $(x,y)$ pair, whether the pixel at that point in the binary image is on or off. In alternative implementations, more complex digital image functions can be used.

To compute the Zernike moments of a given image, in some implementations, the center of mass of the object is taken to be the origin. As Equation (7) shows, because the radial polynomial is symmetric, the magnitude of the Zernike moments are rotation invariant. By taking the center of mass to be the origin before computing a Zernike moment, the moments are, barring subtle changes in images, essentially translation-invariant as well. Thus, for substantially-similar images, their Zernike moments will be substantially similar, even if one is rotated or moved around. Similarly, in some implementations, the systems and techniques scaled images inside a unit circle to provide scale invariance.

One method used in existing systems to improve the speed of Zernike moment computation involves using a quantized polar coordinate system. In one such technique, a square to a circle transformation can be employed for this purpose. In another technique, for an M×M image, angles were quantized to 4M levels and radii were quantized to M levels. Quantization techniques such as these suffer from a side effect, however, as errors are introduced in the computation of high order Zernike moments.

The described procedures that follow employ improved techniques that avoid using quantization, providing computation of Zernike moments with comparable accuracy to traditional approaches (e.g., no approximations). To save computation time, these techniques find terms which occur repeatedly in various orders. Once these terms are computed, they are stored to avoid re-computing the terms later, and are available to be linearly combined with other pre-computed terms. These other terms are stored in a lookup table (such as in the data storage 310 in FIG. 3) and do not depend on any underlying image for which Zernike moments are being computed. Additionally, in one implementation, arbitrary precision arithmetic is used to increase accuracy.

The terms that can be isolated for repeat usage can be found through substitution of Equations (4) and (2) into Equation (7), which results in the following equation, $$Z_{n,m} = \frac{n+1}{\pi}\sum\sum_{x^2+y^2\leq 1}\left(\sum_{k=|m|}^{n}\beta_{n,m,k}\rho^k\right)e^{-jm\theta}f(x,y) \quad (8)$$

$$= \frac{n+1}{\pi}\sum_{k=|m|}^{n}\beta_{n,m,k}\left(\sum\sum_{x^2+y^2\leq 1}e^{-jm\theta}\rho^k f(x,y)\right)$$

It is this final summation (shown in parenthesis at the end) that can be isolated to determine repeating terms. For the sake of simplicity of terminology then, Equation (8) can be rewritten to clarify the repeating term:

$$z_{n,m} = \frac{n+1}{\pi}\sum_{k=|m|}^{n}\beta_{n,m,k}\chi_{m,k} \quad (9)$$

Because these $\chi_{m,k}$ terms do not rely on order number for their computation, once an image function is defined, the $\chi_{m,k}$ terms defined in Equation (9) can be re-used as common terms in future computation of moments. In some implementations, it would be possible, while computing Zernike moments up to order N, for a process to compute $\chi_{m,k}$ for each repetition. However, as FIG. 13 shows, computing $\chi_{m,k}$ once and recording these for future use is enough for computing Zernike moments of any order and any repetition by simply taking linear combinations as shown in Equation (9). FIG. 13 illustrates one example of common terms for Zernike moments up to order 10, for repetition m=0. Moreover, the coefficients $\beta_{n,m,k}$ (detailed in Equations (3) and (4)) do not depend on an image function or coordinates; therefore, they can be stored ahead of time in a small lookup table to save computation.

Figure 14:
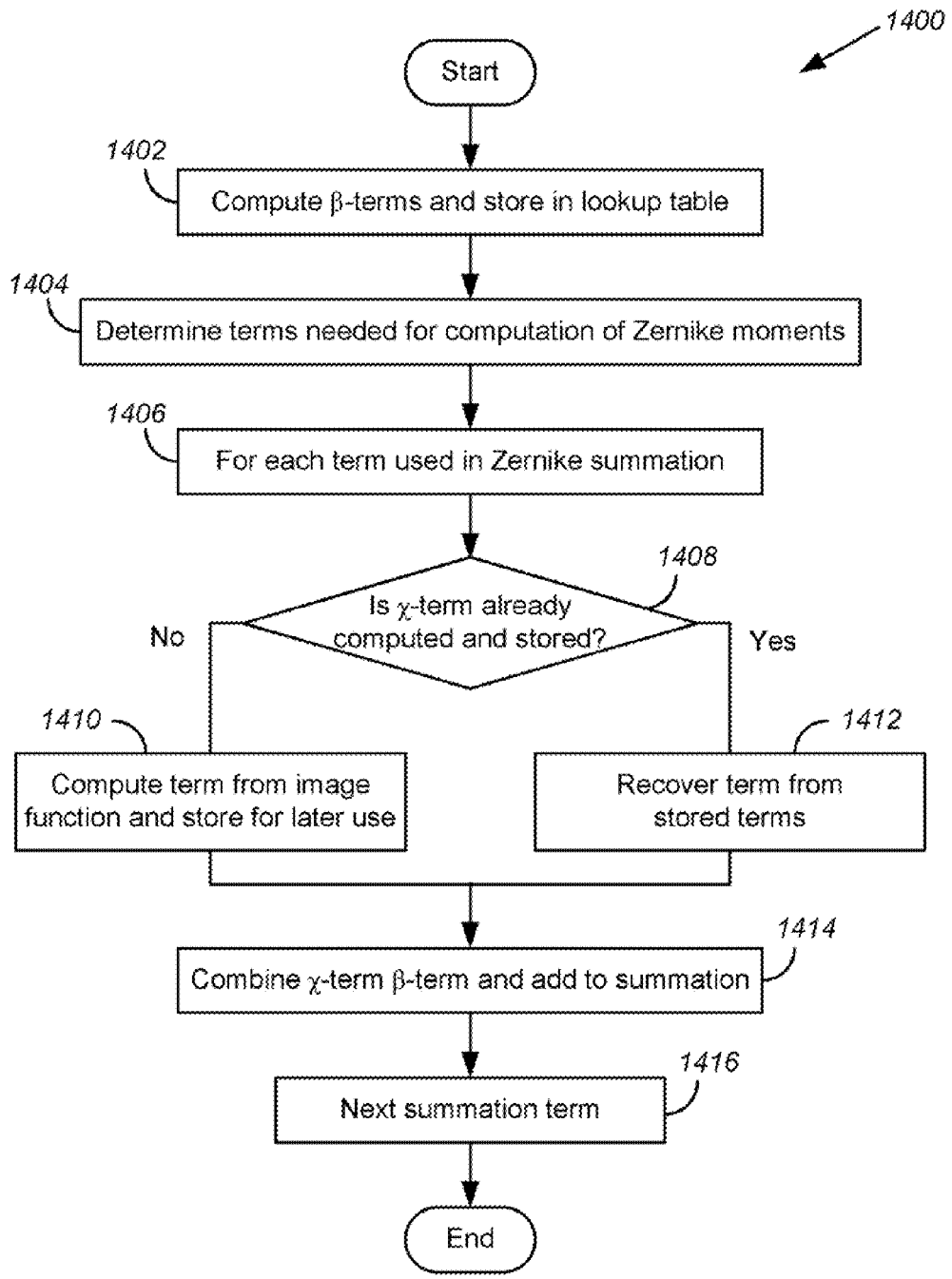
FIG. 14 illustrates an example of a method for computing Zernike moments for a digitally-imaged hand part.

FIG. 14 illustrates an example of a method 1400 performed by the image analysis module 306 (FIG. 3) for computing Zernike moments for an image using stored and re-used terms. In various implementations, the illustrated process blocks may be merged, divided into sub-blocks, or omitted. The method 1400 begins at block 1402, where the $\beta_{n,m,k}$ terms, as defined above, are computed and stored in a lookup table for later use. In various implementations, this process can be performed before any image acquisition is performed, as the $\beta_{n,m,k}$ terms do not rely on an image. Alternatively, the computation can be performed during image acquisition or analysis. Next, at block 1404, the various terms which are needed for computation of the Zernike moments for the image being analyzed are determined. As discussed above, this will change to some degree based on the chosen order of the Zernike moments and the repetition. The method then continues to a loop at block 1406, where a sub-process is performed for each term in the linear combination of Equation (9) used to compute a Zernike moment for the image. Thus, at decision block 1408, the module 306 determines if the necessary $\chi_{m,k}$ term in question at this point in the loop has been computed already. If not, at block 1410, the module 306 computes the term using the image function, and then stores the term for later use. If, instead, the $\chi_{m,k}$ term has been computed, then at block 1412, the term is recovered from data storage 310 (FIG. 3). Next, at block 1414 the $\chi_{m,k}$ and $\beta_{n,m,k}$ are combined in the linear combination of Equation (9), and the loop continues at block 1416.

Some implementations of the systems and methods described herein can also take advantage of adjustments in numerical precision in calculating Zernike moments, to increase accuracy and/or efficiency. Depending on image size and maximum order chosen, double precision arithmetic may not provide enough precision. Serious numerical errors can be introduced into the computation of moments under these conditions. The use of arbitrary precision arithmetic can overcome some of these limitations of double precision arithmetic and avoid undesired errors.

Figure 15:
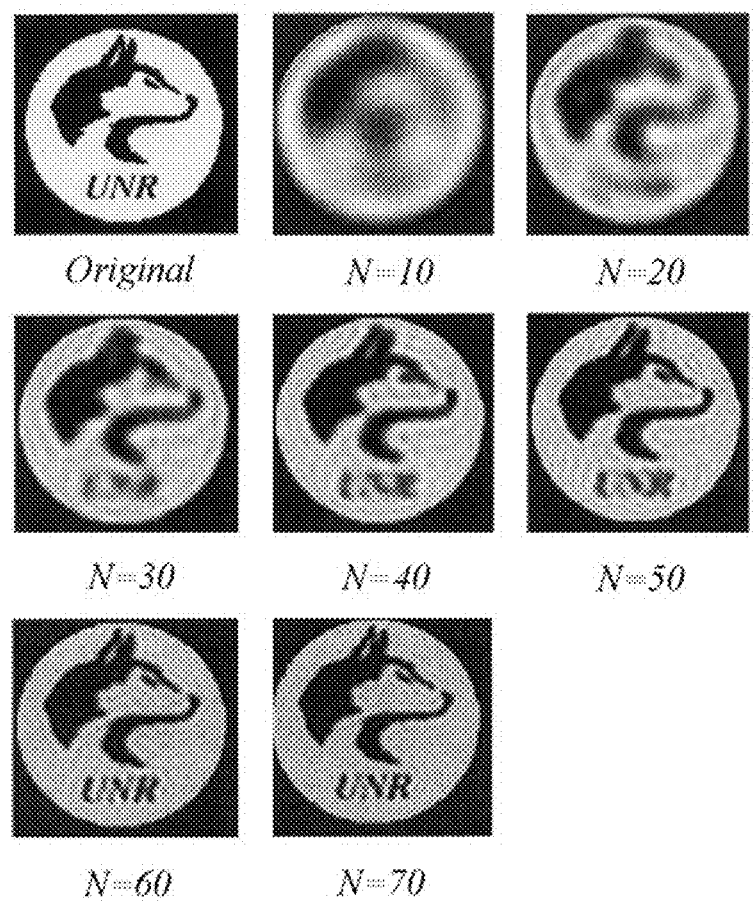
FIG. 15 illustrates examples of images reconstructed from Zernike moments of different orders.

Consideration of the order of the Zernike moments affects both reconstruction accuracy as well as computational efficiency. This effect is demonstrated in FIG. 15, where the 300×300 binary input image at the top-left corner is reconstructed using different orders of Zernike moments (i.e., from order N=10 to N=70). Traditionally, capturing the details of the input image usually utilizes high orders. Using high orders is often not practical, however, due to information redundancy and computational complexity issues. Additionally, there is an inherent limitation in the precision of arbitrary high-order Zernike moments due to the circular geometry of their domain. Thus, in some implementations, the minimum order that still provides high verification accuracy is determined.

Figure 16:
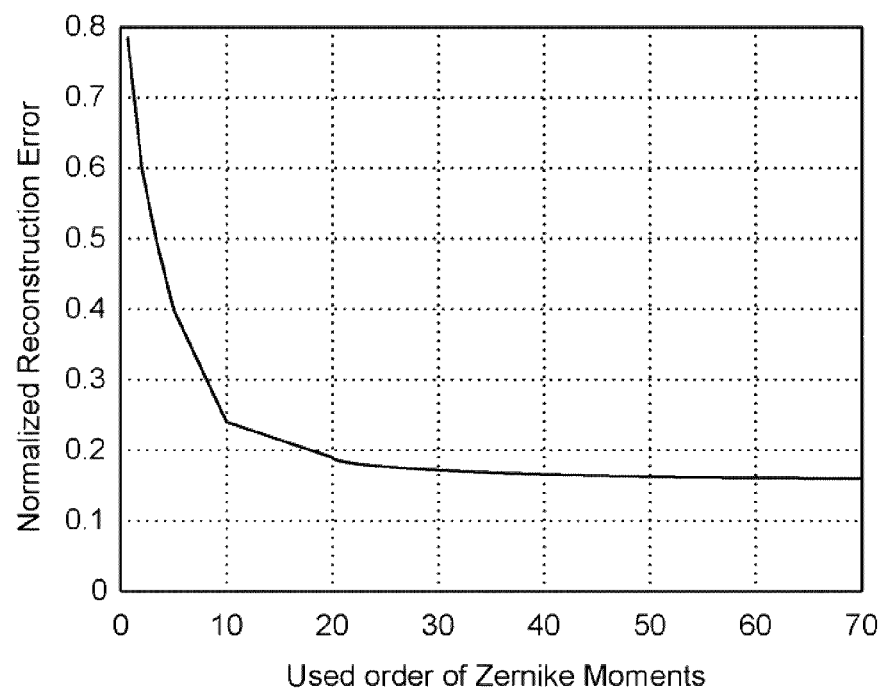
FIG. 16(a) illustrates a graph of example normalized reconstruction error for finger images reconstructed from Zernike moments of different orders.
FIG. 16(b) illustrates examples of reconstructed finger images corresponding to the error data shown in FIG. 16(a)
Figure 16:
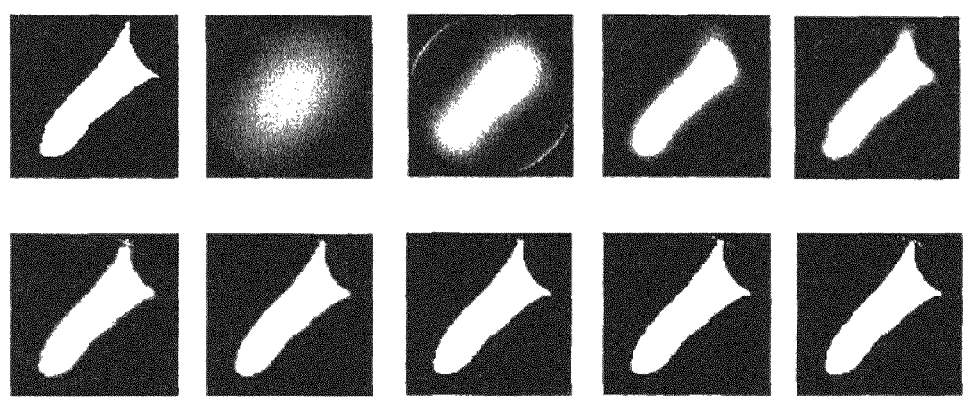
Figure 17:
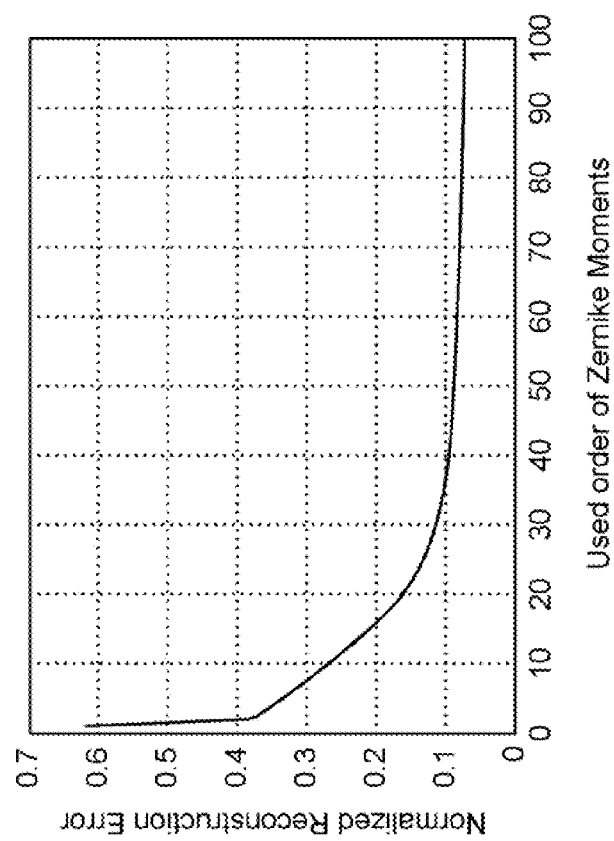
FIG. 17(a) illustrates a graph of example normalized reconstruction errors for entire hand images reconstructed from Zernike moments of different orders.
FIG. 17(b) illustrates examples of reconstructed hand images corresponding to the error data shown in FIG. 17(a)
Figure 17:
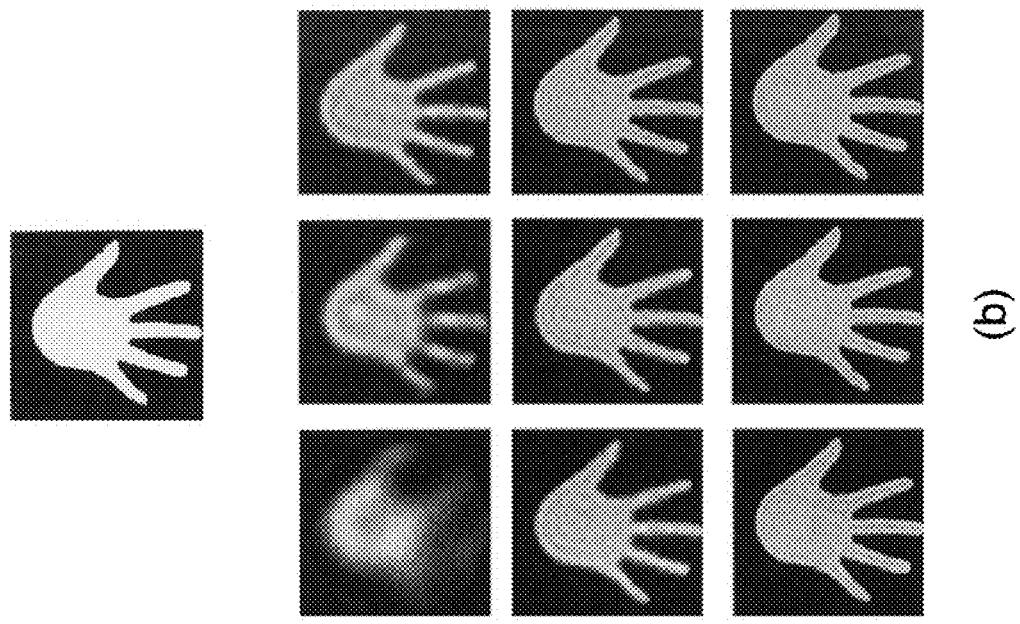

To determine this minimum order, one implementation uses the average reconstruction error on a large number of hand images to decide the maximum moment order that would be useful in the context of gender classification. FIG. 16(*a*) shows the reconstruction error of fingers for different orders. As it can be observed, the error almost saturates for orders higher than 40. In FIG. 16(*b*), the reconstructions of a finger for different orders are shown. In FIG. 16(*b*), the first image is the original image, while, from left to right, top to bottom, reconstructed images of original image are shown up to order 2, 5, 10, 20, 30, 40, 50, 60 and 70, respectively. The saturation observed in FIG. 16(*a*) is visually evident in FIG. 16(*b*). By contrast, FIGS. 17(*a*) and 17(*b*) show a similar reconstruction error graph and reconstructed images for an image of an entire hand. The reconstructed images of FIG. 17(*b*) are for the same orders as in the images of FIG. 16(*b*). As FIGS. 17(*a*) and 17(*b*) show, a higher order is necessary for good precision when attempting to precisely analyze an entire hand.

The cost of higher-order Zernike moment computation is very high, especially when precision is a requirement. Using one implementation for computing high order Zernike moments, it typically takes six minutes to compute Zernike moments up to order 70, while it only takes 35 seconds to compute moments up to order 30. One reason for low execution speed is the use of arbitrary precision arithmetic. However, moments of up to order 30 can be computed with relatively high accuracy even without the use of arbitrary-precision arithmetic. Thus, in an alternative implementation, a hybrid implementation is used, where the use of arbitrary precision arithmetic is restricted to high orders only, increasing system speed. In one such implementation, using double precision instead of arbitrary precision arithmetic to compute moments up to order 36 yields an error of less than 0.5%. Additional alternative hardware implementations using field programmable gate arrays (FPGAs) can speed up the process as well.

This great increase in speed and reduction in complexity for lower orders supports the segmentation of the hand into finger and palm segments, as described above. As for the chosen order for the image segments, the experimentally-obtained order chosen to represent fingers in one implementation of the system is 20, while the order chosen to represent a palm is 30. In various implementations, a maximum order depends on the resolution of the image. To decrease the size of a set of feature parameters, one implementation uses dimensionality reduction based on Principal Components Analysis (PCA). PCA is described in more detail by R. Duda, P. Hart, and D. Stork in "Pattern Classification", Wiley-Interscience, 2nd edition, 2000, which is hereby incorporated by reference for all that it discloses, to the extent not inconsistent with the present disclosure.

5b. Examples of Fourier Descriptor Computation

Fourier descriptors have been used as feature parameters to describe the boundaries of objects in a wide range of applications. Fourier descriptors can be used by process block 102 of method 100 (FIG. 1(*a*)), or the process block 112 of method 110 (FIG. 1(*b*)) to describe the geometries (i.e., boundaries) of different hand parts. Fourier descriptors provide an alternative to Zernike moments for computing sets of features that describe the geometries of different hand parts.

Consider a closed contour C in the complex plane. In this case, the x-y coordinates of each point in the boundary become a complex number x+jy. By tracing the boundary in a counterclockwise direction with uniform velocity, a complex function $z(t)=\chi(t)+jy(t)$ is obtained with parameter t. The velocity is chosen such that the time required to traverse the contour is $2\pi$. If z(k) is a uniformly re-sampled version of z(t), of dimension N, its Discrete Fourier Transform (DFT) is given by the following equation:

$$z(k) = \sum_{n=0}^{N} a_n e^{\frac{j2\pi nk}{N}} \qquad (10)$$

where $\alpha_n$ is Fourier coefficient of z(k). The Fourier descriptors of the closed contour C are defined by taking the inverse transform:

$$a_n = \frac{1}{N}\sum_{k=0}^{N} z(k)e^{\frac{-j2\pi nk}{N}}, n \in \{1, 2, \ldots, N\}. \qquad (11)$$

To normalize the Fourier descriptors with respect to translation, rotation, scale, and starting point, the methodology proposed by T. Wallace and P. Wintz in "An efficient three-dimensional aircraft recognition algorithm using normalized fourier descriptors", Computer Vision Graphics Image Processing, 13, 1980 can be used. The methodology proposed by Wallace, et al. is hereby incorporated by reference, to the extent not inconsistent with the present disclosure. With this methodology, the dimensionality of the contour (N) must be a power of 2. Because the average number of points in the boundary of different parts of the hand, when scanned at a VGA resolution, is in the range of $[2^7, 2^8]$ for fingers and $[2^8, 2^9]$ for the palm, the finger and palm contours can be sampled at 256 and 512 points respectively. To decrease the size of a set of feature parameters, one implementation uses dimensionality reduction based on Principal Components Analysis (PCA).

6. Gender Classification Based on a Single Hand Part

In some implementations, the distance computations and gender classification undertaken by process blocks 114 and 116 of the method 110 (FIG. 1(b)) are undertaken for each hand part separately, or for only some hand parts (e.g, for a single finger, or just the palm). In these implementations, it has been noted that certain hand parts, such as thumb hand parts, often provide more discrimination power for classifying gender.

Figure 18:
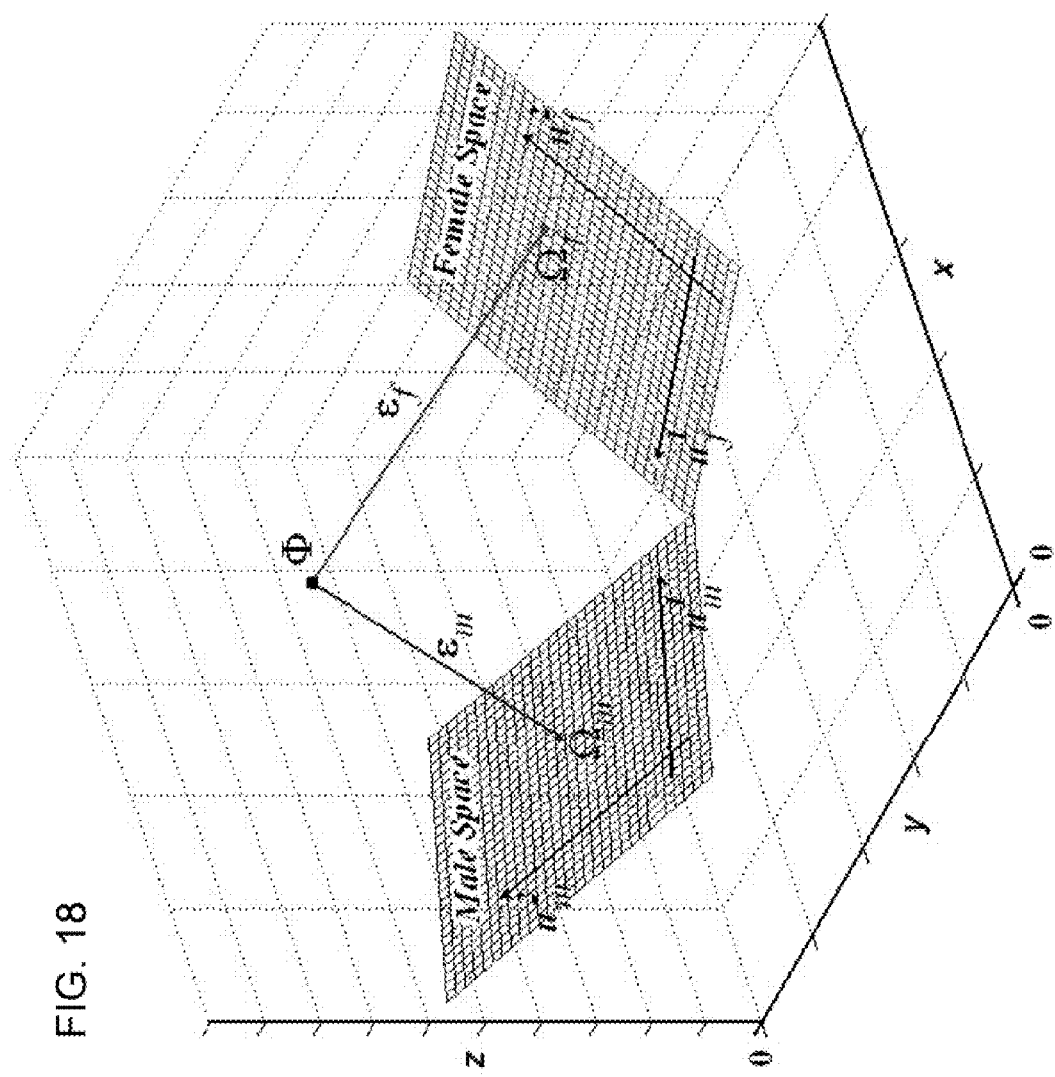
FIG. 18 illustrates example male and female eigenspaces, and the computation of respective distances, $\epsilon_m$ and $\epsilon_f$, from i) a feature vector $\Phi$ representing the geometry of a digitally-imaged hand part, and ii) each of the male and female eigenspaces.

Consider now a set of feature parameters for a single type of digitally-imaged hand part (e.g., a particular finger, or the palm). Two different eigenspaces can be built for the type of hand part. The first eigenspace corresponds to the male class, and the second eigenspace corresponds to the female class. Such male and female eigenspaces 1800, 1802 are shown in FIG. 18. If other types of hand parts are to be classified, a similar, but separate, pair of male and female eigenspaces is built for each type of hand part. Thus, to classify each of five different fingers and a palm, twelve eigenspaces are built.

FIG. 18 illustrates a set of feature parameters (or feature vector, $\Phi = [\phi_1, \phi_2 \ldots \phi_N]$, where each $\phi_i$ is a feature parameter) representing the geometry of a particular hand part. In accord with process block 114 of the method 110 (FIG. 1(b)), distances between $\Phi$ and each of the male and female eigenspaces 1800, 1802 are computed. This computation can be performed by the image analysis module 306 shown in FIG. 3. The computation can be performed by projecting the hand part, as represented by its set of feature parameters, onto each eigenspace, and then reconstructing the hand part from its projections. To compute the error in each eigenspace, a difference can be computed between the original representation of the part and its reconstruction. Specifically, assume that $\Omega_{m/f}$ where $\Omega_f = [\Omega_f^1 \Omega_f^2 \ldots \Omega_f^N]$ and $\Omega_m = [\Omega_m^1 \Omega_m^2 \ldots \Omega_m^N]$, corresponds to the representation of an instance $\Phi$ of some part $\rho$ in the male/female eigenspaces; then $\Omega_{m/f}$ is given by:

$$\Omega_{m/f} = \sum_{k=0}^{M} \omega_{m/f}^k u_{m/f}^k + \overline{\Phi}_{m/f} \quad (12)$$

where the projection a of $\omega_{m/f}^k$ of $\Phi$ in the male/female eigenspaces can be computed as follows:

$$\omega_{m/f}^k = \mu_{m/f}^k (\Phi - \overline{\Phi}_{m/f});$$

where M represents the dimensionality of the eigenspaces; where $\mu_{m/f}^k$ is the kth eigenvector in the male/female eigenspace; and where $\overline{\Phi}_{m/f}$ is an average male/female vector, computed from a set of training data for a particular type or set of hand parts. Also, $\mu_{m/f}^k$ is the transpose of $\mu_{m/f}^k$.

To measure the masculine/feminine characteristic of $\Phi$, the Euclidean distance $\epsilon_{m/f}$ between $\Phi$ and its projection onto the male/female eigenspaces is computed as follows:

$$\epsilon_{m/f} = \|\Phi - \Omega_{m/f}\| \quad (14)$$

Therefore, for each hand part $\rho$, a distance vector $E = [\epsilon_m, \epsilon_f]^T$ representing the hand part can be computed. FIG. 18 illustrates this process. In some implementations, the same amount of information is preserved for each of the male/female eigenspaces; however, this could be varied depending on the shape descriptor (i.e., set of feature parameters) used to represent the part $\rho$.

Figure 19A:
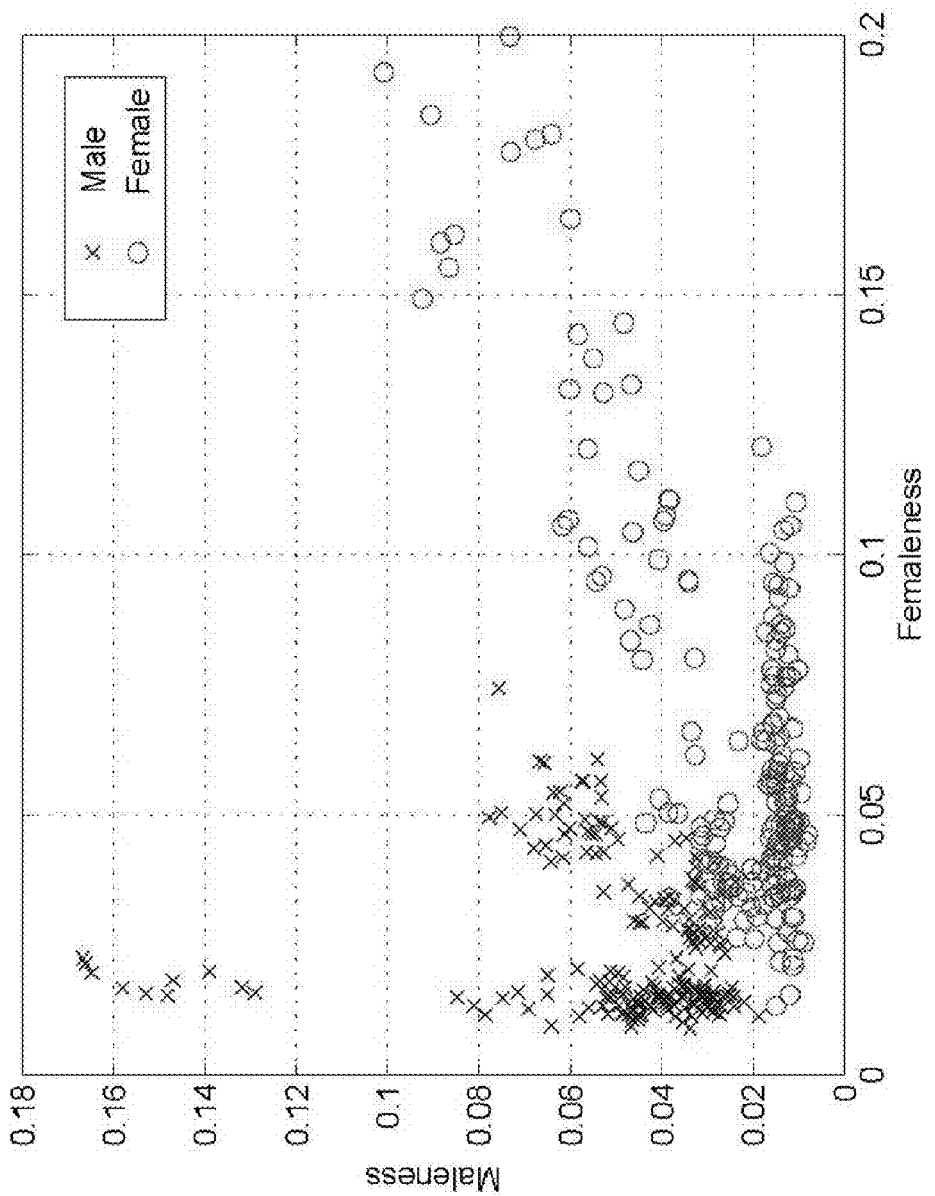
FIGS. 19(a) and (b) illustrate distributions of distances to each of male and female eigenspaces, for a set of training data corresponding to digitally-imaged little fingers, and for Zernike moments computed for the images in the set of training data (in FIG. 19(a)) or Fourier descriptors computed for the images in the set of training data (in FIG. 19(b))
Figure 19B:
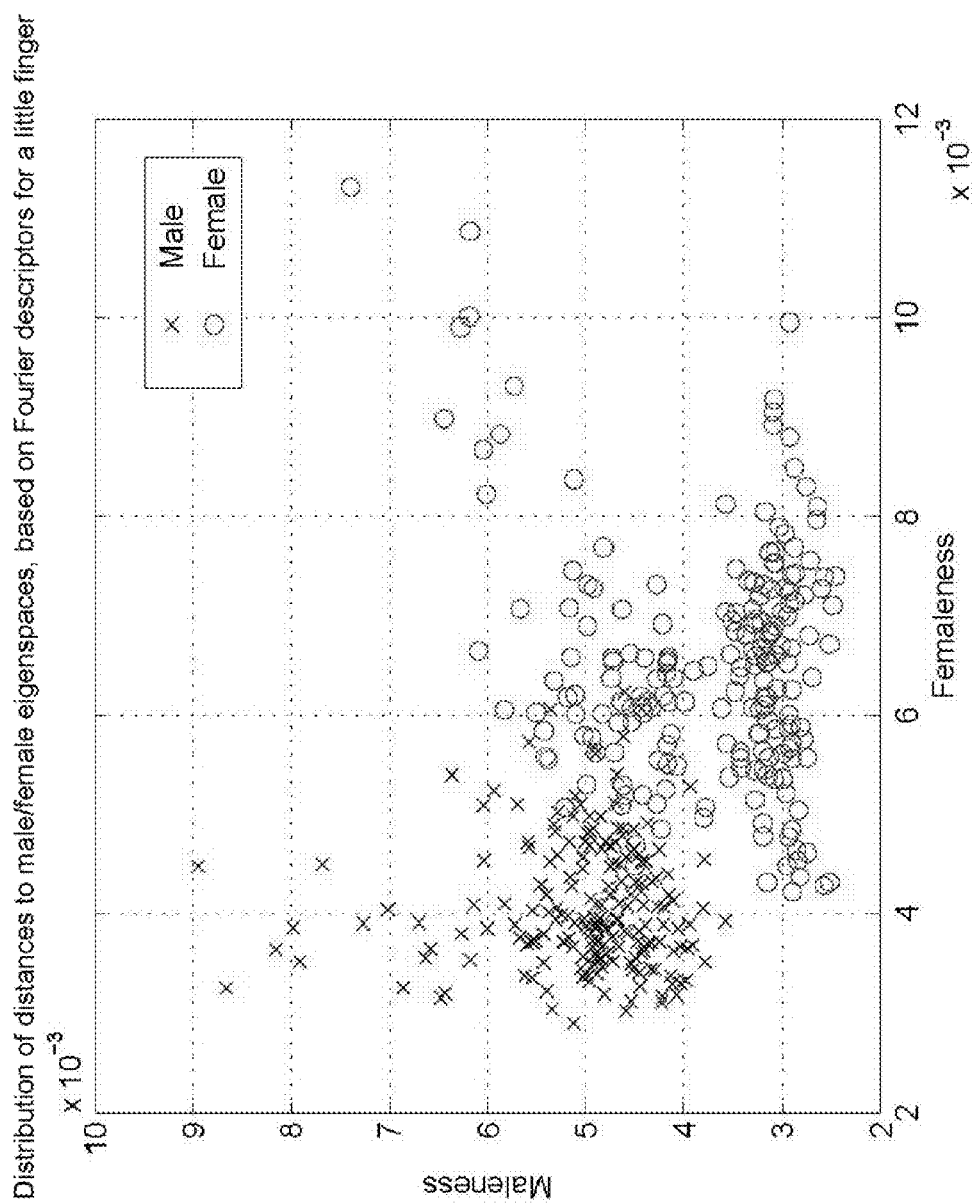

By way of example, FIGS. 19(a) and 19(b) respectively show the distribution of distances $\epsilon_{m/f}$ in the case of a little finger represented by Zernike moments (FIG. 19(a)) and Fourier descriptors (FIG. 19(b)). The male/female eigenspaces represented in these figures were generated using training data from 12 males and 12 females, preserving 99% information.

Following computation of the distances between a hand part's set of features and each of male/female eigenspaces, the computed distances can be used to classify the gender of the hand. This is done at process block 116 (FIG. 1(b)) by gender classification module 308 (FIG. 3). Classification of a distance vector E can be undertaken in a variety of ways. Described below are three examples of such ways, including, a Minimum Distance (MD) approach, a k-Nearest Neighbors (kNN) approach, and a Linear Discriminant Analysis (LDA) approach.

In the case of MD classification, a hand is classified as belonging to the gender class to which a digitally-imaged hand part is closest. That is, a hand is classified based on a set of one or more of its parts being closer to the male or female eigenspace on which it is projected. In the case of a tie, the hand can be arbitrarily classified as male or female, depending on the tie-breaking convention that has been adopted.

In the case of kNN classification, the distance vector E is compared to each of k-nearest neighbor distance vectors in a set of training data. A hand is then classified as belonging to the gender class of a majority of the k-nearest neighbors. Again, in the case of a tie, the hand can be arbitrarily classified as male or female, depending on the tie-breaking convention that has been adopted.

In the case of LDA, the distances of a distance vector are combined into a single classification score. This can be done by multiplying the distance vector E by a simple 2×1 matrix $H_{2\times1}$. The coefficients of the $H_{2\times1}$ matrix can be computed from training samples.

Figure 20A:
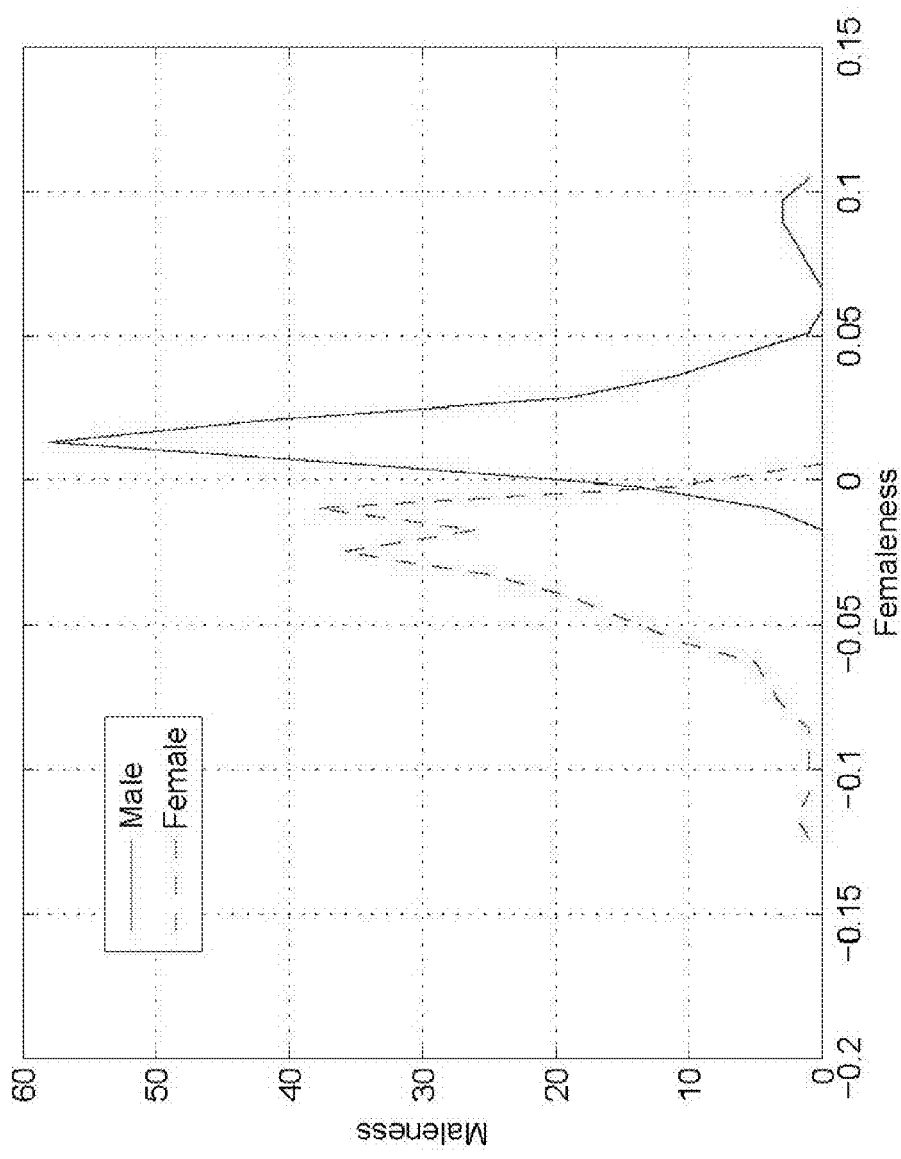
FIGS. 20(a) and (b) illustrate distributions of male and female classification scores for a set of training data, where the male and female classification scores are computed using Linear Discriminant Analysis (LDA) and i) the distances based on Zernike moments shown in FIG. 20(a), or ii) the distances based on Fourier descriptors shown in FIG. 20(b)
Figure 20B:
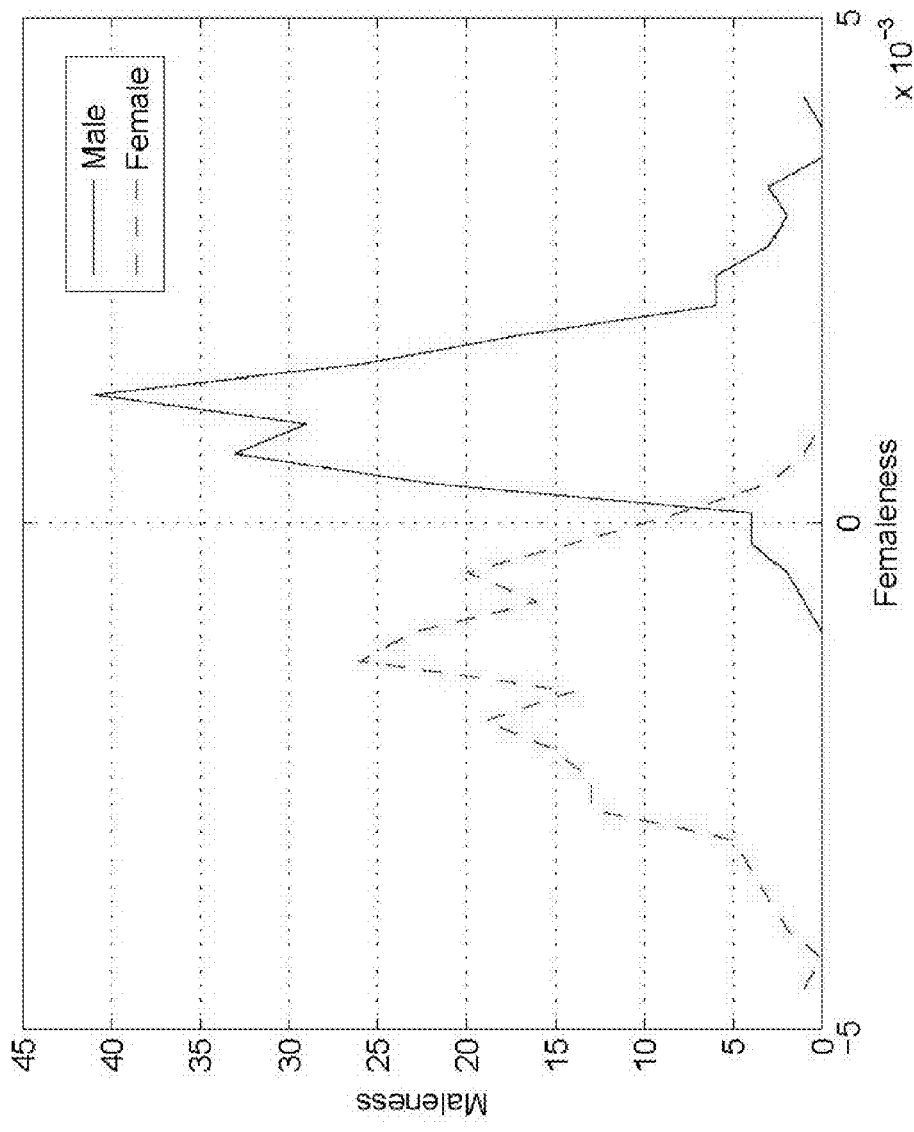

Using LDA, the gender of a hand is classified by comparing i) the single classification score to ii) a threshold computed from a set of training data. FIGS. 20(a) and 20(b) illustrate the distributions of classification scores for a set of little finger training data. The distribution shown in FIG. 20(a) is for classification scores based on Zernike moments. The distribution shown in FIG. 20(b) is for classification scores based on Fourier descriptors. In each of these figures, the distributions of classification scores for the male and female classes overlap. As a result, an appropriate threshold (and sometimes a point corresponding to the intersection of the two distributions) needs to be manually or automatically selected.

7. Gender Classification Using Fusion

Different parts of the hand have their inherent strengths and weakness. As a result, fusing information from two or more hand parts, or all of the fingers and the palm, can sometimes improve overall gender classification performance. Recently, Amayeh et al. considered the problem of fusing information from the fingers and palm for hand-based authentication, illustrating accuracy improvements. See, G. Amayeh, G. Bebis, A. Erol, and M. Nicolescu, "A component-based approach to hand verification", IEEE Computer Society Workshop on Biometrics, June 2007. Similarly, the following sections of this disclosure discuss how to combine (or fuse) information from the fingers and palm of a hand to improve gender classification accuracy and robustness. Various implementations employ feature-level fusion, score-level fusion, or decision-level fusion (or a combination thereof).

7a. Feature-Level Fusion

For feature-level fusion, the sets of feature parameters representing the geometries of two or more hand parts can be concatenated into one feature vector. Alternately, the distance vectors E of two or more hand parts can be fused (e.g., corresponding distances to the male or female eigenspace can be averaged or otherwise combined). PCA can then be applied to reduce the dimensionality of the feature vector.

When building male and female eigenspaces on which the feature vector is projected, the eigenspaces are built for fused sets of feature parameters. Otherwise, classification of a hand based on the fused sets of feature parameters proceeds as discussed in Section 6 of this disclosure.

Figure 21:
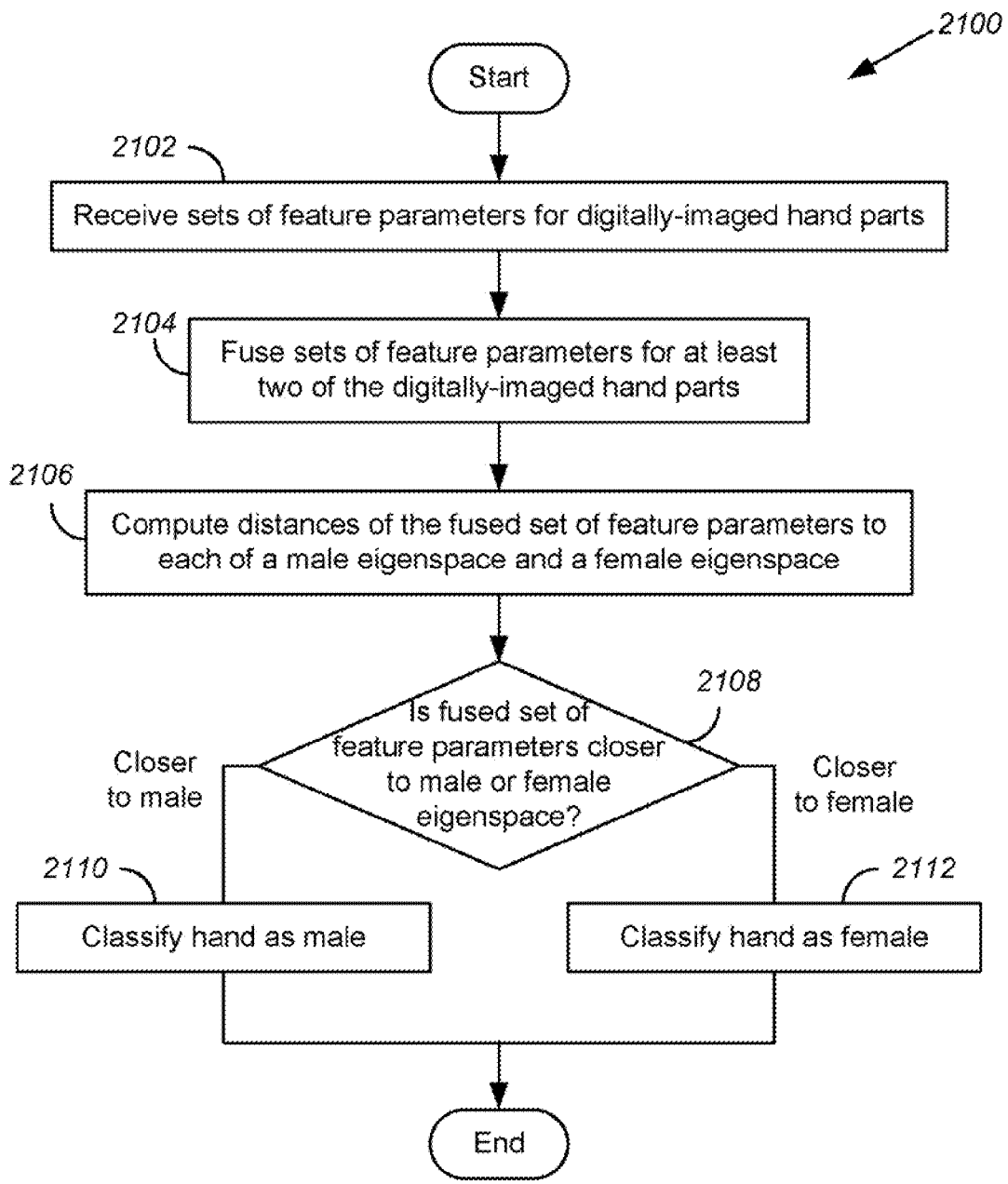
FIG. 21 illustrates a third example of a method for classifying the gender of a hand, wherein an example of feature-level fusion is employed.

FIG. 21 illustrates an example of a method 2100 performed by the image analysis module 306 and decision module 308 (FIG. 3) for fusing data associated with sets of feature parameters (e.g., Zernike moments or Fourier descriptors) for different hand parts. In various implementations, the illustrated process blocks may be merged, divided into sub-blocks, or omitted. The method 2100 begins at block 2102, where the module 306 receives sets of feature parameters that have been individually computed for each of two or more digitally-imaged hand parts. Next, at block 2104, the sets of feature parameters corresponding to the two or more hand parts are fused or combined (e.g., concatenated) into a feature vector that represents the overall geometry of the two or more hand parts (i.e., the geometry of a set of digitally-imaged hand parts). In some implementations, the sets of feature parameters corresponding to all of a hand's parts can be combined. The resulting representation, in certain implementations, is invariant to various transformations, including translation, rotation and scaling transformations.

Next, at block 2106, the distances of the feature vector from each of i) a first eigenspace corresponding to a male class, and ii) a second eigenspace corresponding to a female class, are computed.

By way of example, the method 2100 is shown to employ minimum distance (MD) classification. However, other classification techniques can be employed in alternative implementations of the method 2100. With MD classification, the method determines at decision block 2108 whether the set of digitally-imaged hand parts received in process block 2102 is closest to the male class (represented by the male eigenspace) or the female class (represented by the female eigenspace). The hand to which the set of digitally-imaged hand parts belong is then classified, based on the decision made at block 2108, as belonging to the male class (at block 2110) or belonging to the female class (at block 2112).

7b. Score-Level Fusion

For score-level fusion, the process performed at process block 114 of the method 110 (FIG. 1(b)) is separately performed for each of at least two hand parts. That is, distances are computed between i) a set of feature parameters representing a particular hand part, and ii) each of first and second eigenspaces corresponding, respectively, to male and female classifications of the type of hand part at issue. Of note, each of the performances of the process performed at process block 104 is undertaken with respect to a different set of eigenspaces—i.e., a set of eigenspaces corresponding to the particular type of part for which the process is being performed. Thus, if the process performed at process block 104 is separately performed for each of five finger hand parts, and one palm hand part, twelve eigenspaces are constructed from training data (e.g., a male and female eigenspace for each type of hand part).

After computing the distances of each hand part to its corresponding male and female eigenspaces, the computed distances are combined to form a separate classification score for each hand part. These classification scores are then assigned weights, in accordance with a weighting function; and the weighted classification scores are combined into an overall score. The gender of a hand is then classified by comparing i) the overall score to ii) a threshold computed from a set of training data.

In some implementations, the score-level fusion described above, or variants thereof, can be combined with a feature-level fusion technique. That is, sets of feature parameters for different hand parts can be combined to form sets of feature parameters for multiple hand parts (e.g., a first set of feature parameters for the palm and thumb, and a second set of feature parameters for the remaining fingers; or, a first set of feature parameters corresponding to a hand's fingers, and a second set of feature parameters corresponding to a hand's palm). The distances of combined (or fused) sets of feature parameters to respective male and female eigenspaces can then be computed.

In some implementations, the classification scores for each hand part (or set of hand parts) are computed using linear discriminant analysis (LDA).

The weighted sum rule is one example of a weighting function. In the case of a weighted sum, classification scores are combined into an overall score by applying an appropriate weight to each classification score, as follows:

$$S = \sum_{i=1}^{6} w_i s_i \qquad (15)$$

where $s_i$ is the classification score of the i-th part, and $w_i$ is the weight associated with this part. Typically, the weights satisfy the constraint of $\Sigma w_i = 1$.

Determining the proper weights to be used by a weighting function can be important to obtain good accuracy for gender classifications. In some implementations, weights are determined experimentally through a search over an empirically determined set of weights, to maximize accuracy over a database of test data.

Figure 22:
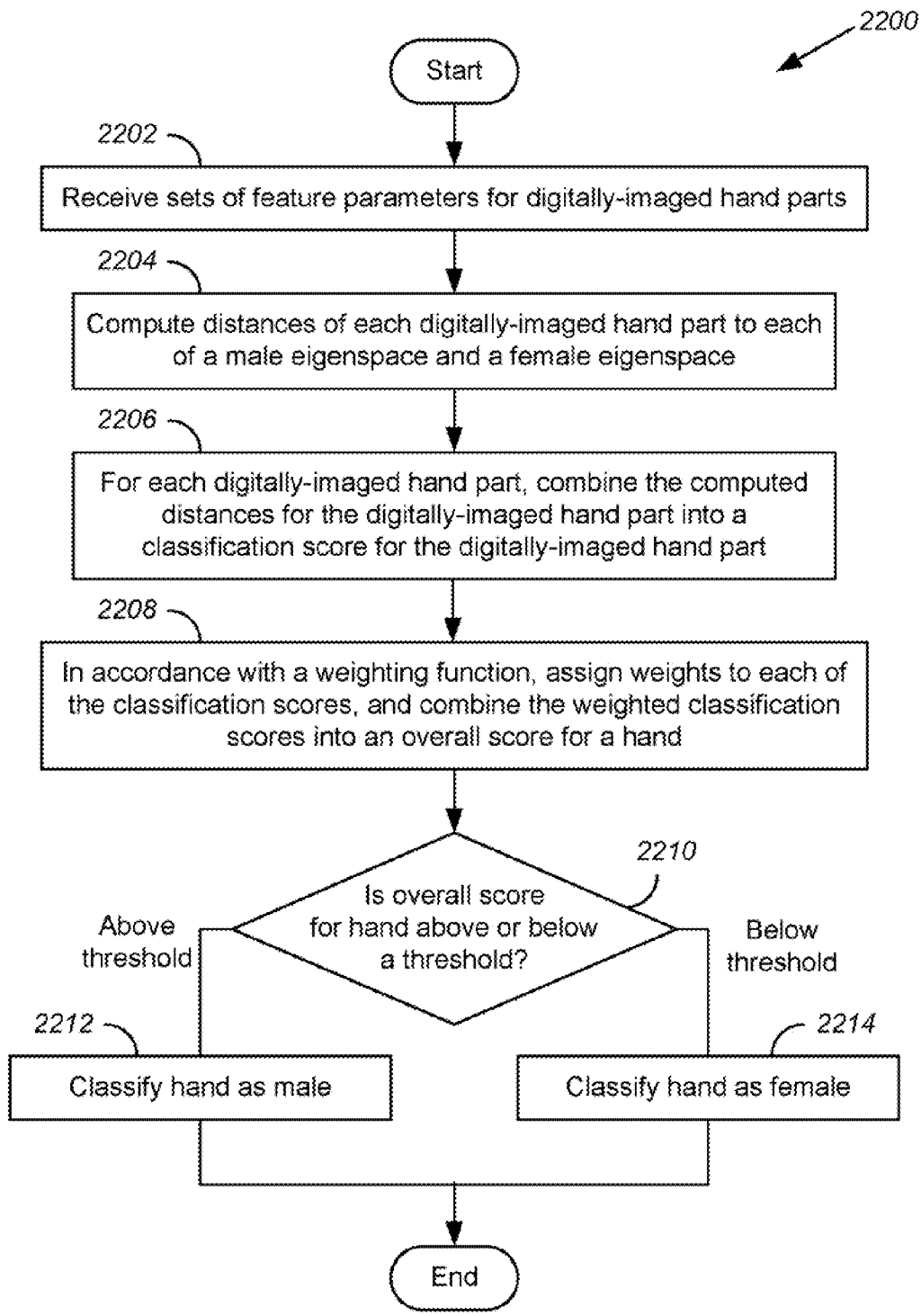
FIG. 22 illustrates a fourth example of a method for classifying the gender of a hand, wherein an example of score-level fusion is employed.

FIG. 22 illustrates an example of a method 2200 performed by the image analysis module 306 and decision module 308 (FIG. 3) for fusing classification scores for different hand parts. In various implementations, the illustrated process blocks may be merged, divided into sub-blocks, or omitted. The method 2200 begins at block 2202, where the module 306 receives sets of feature parameters for each of two or more digitally-imaged hand parts. Next, at block 2204, the distances of each digitally-imaged hand part from i) a first eigenspace corresponding to a male class, and ii) a second eigenspace corresponding to a female class, are computed. The computation of distances for each hand part is undertaken with respect to a different set of eigenspaces, with each set of eigenspaces corresponding to a particular type of digitally-imaged hand part. Types of digitally-imaged hand parts can include, for example, little, ring, index, pointer and thumb fingers, the palm, and fused combinations of two or more of these hand parts.

At block 2206, and again for each digitally-imaged hand part, the computed distances for a particular hand part are combined into a classification score for the particular hand part. In some implementations, the classification scores can be computed using linear discriminant analysis (LDA).

In some implementations, the above processes of the method 2200 may be performed with respect to fused sets of digitally-imaged hand parts, instead of, or in conjunction with, individual digitally-imaged hand parts.

At block 2208, and in accordance with a weighting function, weights are assigned to each of the classification scores, and the weighted classification scores are combined into an overall score for a hand.

Finally, and at blocks 2210, 2212 and 2214, the gender of a hand is classified by comparing i) the overall score for the hand to ii) a threshold computed from a set of training data. If the overall score is above the threshold, the hand is classified as belonging to one gender (e.g., male) at block 2212. If the overall score is below the threshold, the hand is classified as belonging to the other gender (e.g., female) at block 2214.

7c. Decision-Level Fusion

For decision-level fusion, the gender classification of a hand is obtained by fusing individual classifications of different parts of the hand. In some embodiments, each part of the hand can be classified using LDA, though any other classification can also be used. To fuse the individual classifications, a voting method can be employed—such as majority voting. For example, the gender of each part of the hand can be classified; and then the hand, as a whole, can be classified based on a majority vote of the individual classifications of the hand parts. Tie votes can be broken either way, but in some embodiments are broken by classifying a hand as male if three or more parts of the subject's hand have been classified as male, and otherwise classifying the hand as female.

Figure 23:
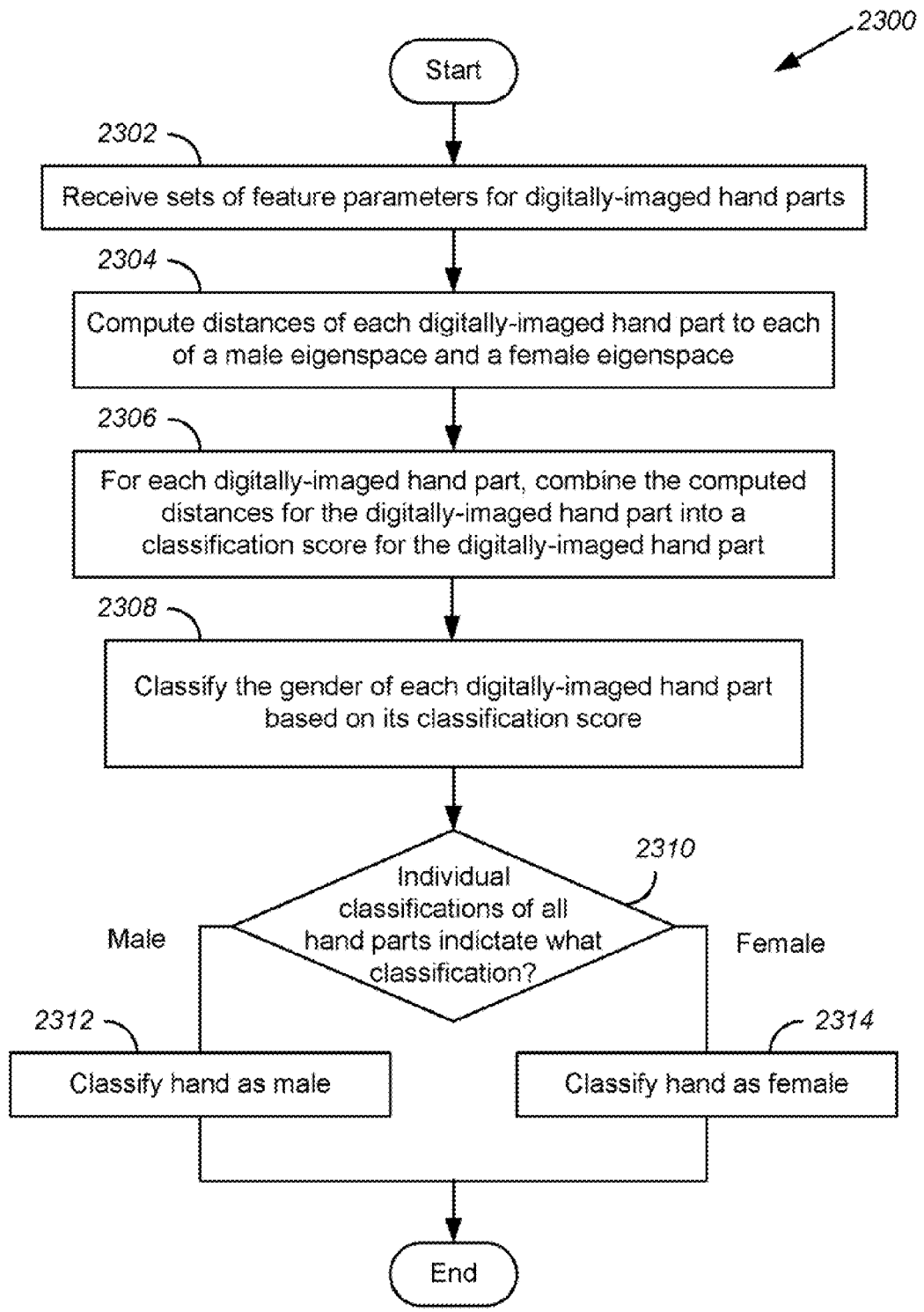
FIG. 23 illustrates a fifth example of a method for classifying the gender of a hand, wherein an example of decision-level fusion is employed.

FIG. 23 illustrates an example of a method 2300 performed by the image analysis module 306 and decision module 308 (FIG. 3) for fusing classification decisions for different hand parts. In various implementations, the illustrated process blocks may be merged, divided into sub-blocks, or omitted. The method 2300 begins at block 2302, where the module 306 receives sets of feature parameters for each of two or more digitally-imaged hand parts. Next, at block 2304, the distances of each digitally-imaged hand part from i) a first eigenspace corresponding to a male class, and ii) a second eigenspace corresponding to a female class, are computed. The computation of distances for each hand part is undertaken with respect to a different set of eigenspaces, with each set of eigenspaces corresponding to a particular type of digitally-imaged hand part. Types of digitally-imaged hand parts can include, for example, little, ring, index, pointer and thumb fingers, the palm, and fused combinations of two or more of these hand parts.

At block 2306, and again for each digitally-imaged hand part, the computed distances for a particular hand part are combined into a classification score for the particular hand part. In some implementations, the classification scores can be computed using linear discriminant analysis (LDA).

At block 2308, and for each digitally-imaged hand part, the classification score for each digitally-imaged hand part is used to classify the gender of the hand part.

In some implementations, the above processes of the method 2300 may be performed with respect to fused sets of digitally-imaged hand parts, instead of, or in conjunction with, individual digitally-imaged hand parts.

At blocks 2310, 2312 and 2314, the gender of a hand is classified as male or female based on the individual classifications of its parts. In some implementations, majority voting is used.

8. Computing Environment

The above hand-based gender classification techniques and systems can be performed on any of a variety of computing devices. The techniques can be implemented in hardware circuitry, as well as in software executing within a computer or other computing environment, such as shown in FIG. 24.

Figure 24:
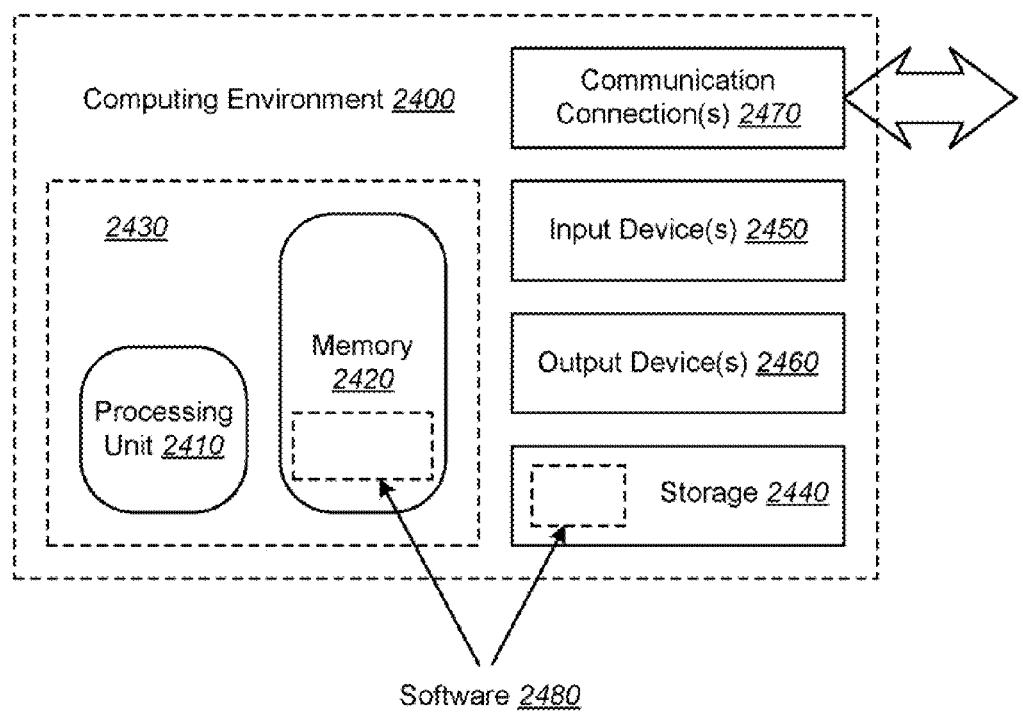
FIG. 24 illustrates a sixth example of a system for performing the method shown in FIG. 1(a) or 1(b) (or the methods shown in FIG. 21, 22 or 23, or other methods).

FIG. 24 illustrates a generalized example of a suitable computing environment 2400 in which described embodiments can be implemented. The computing environment 2400 is not intended to suggest any limitation as to scope of use or functionality of the invention, as the present invention can be implemented in diverse general-purpose or special-purpose computing environments.

With reference to FIG. 24, the computing environment 2400 includes at least one processing unit 2410 and memory 2420. In FIG. 24, this most basic configuration 2430 is included within a dashed line. The processing unit 2410 executes computer-executable instructions and can be a real or a virtual processor. In a multi-processing system, multiple processing units execute computer-executable instructions to increase processing power. The memory 2420 can be volatile memory (e.g., registers, cache, RAM), non-volatile memory (e.g., ROM, EEPROM, flash memory, etc.), or some combination of the two. The memory 2420 stores software 2480 implementing the described techniques.

A computing environment can have additional features. For example, the computing environment 2400 includes storage 2440, one or more input devices 2450, one or more output devices 2460, and one or more communication connections 2470. An interconnection mechanism (not shown) such as a bus, controller, or network interconnects the components of the computing environment 2400. Typically, operating system software (not shown) provides an operating environment for other software executing in the computing environment 2400, and coordinates activities of the components of the computing environment 2400.

The storage 2440 can be removable or non-removable, and includes magnetic disks, magnetic tapes or cassettes, CD-ROMs, CD-RWs, DVDs, or any other medium which can be used to physically store information and which can be accessed within the computing environment 2400. The storage 2440 stores instructions for the software 2480 implementing the described techniques.

The input device(s) 2450 can be a touch input device such as a keyboard, mouse, pen, or trackball, a voice input device, a scanning device, or another device that provides input to the computing environment 2400. For audio, the input device(s) 2450 can be a sound card or similar device that accepts audio input in analog or digital form, or a CD-ROM reader that provides audio samples to the computing environment.

In some implementations, the input device(s) 2450 can include part or all of the image acquisition sub-system 302 (FIG. 3) or the image acquisition system 500 (FIG. 5(*a*)), including one or more of a camera, scanner, video camera or other device for acquiring an image of part or all of a hand. The input device(s) 2450 can also, or alternatively, include devices, user interfaces (e.g., graphical user interfaces), buttons, switches, or other input device(s) that enable an operator of the computing environment to interact with, operate, launch or program the computing environment.

The output device(s) 2460 can include a display, printer, speaker, CD-writer, or other device that provides output from the computing environment 2400. In some implementations, "output" can take the form of a gender classification decision; a depiction of a hand or hand parts being classified; a depiction of one or more hands or hand parts to which a hand or hand parts being classified is/are compared; or warnings or error messages. "Output" may also take other forms. In some cases, the "output" may be in visual, printed or digitally-stored forms.

The communication connection(s) 2470 enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available physical (tangible) media that can be accessed within a computing environment. By way of example, and not limitation, with the computing environment 2400, computer-readable media include memory 2420, storage 2440, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer executable instructions for program modules can be executed within a local or distributed computing environment.

For the sake of presentation, the detailed description uses terms like "determine," "calculate," and "compute," to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

What is claimed is:

1. A method of classifying the gender of a hand having a plurality of hand parts, the method comprising:
   for each of at least two digitally-imaged hand parts, where each of the at least two digitally-imaged hand part corresponds to one of the plurality of hand parts, computing a set of feature parameters representing a geometry of the digitally-imaged hand part;
   using the sets of feature parameters for a set of two or more of the digitally-imaged hand parts, (a) combining sets of feature parameters for different hand parts to form sets of feature parameters for multiple hand parts, wherein a first set of feature parameters corresponds to a hand's fingers and a second set of feature parameters corresponds to the hand's palm and (b) computing a similarity of the set of two or more digitally-imaged hand parts to each of i) a first model eigenspace corresponding to a male class, and ii) a second model eigenspace corresponding to a female class, wherein the computed similarities are distances to each of the first and second eigenspaces; and
   using the computed distances to classify the gender of the hand as belonging to the male class or the female class comprising:
      forming a distance vector from the computed distances;
      comparing the distance vector to each of k-nearest neighbor distance vectors in a set of training data; and
      classifying the gender of the hand as belonging to the class corresponding to a majority of the k-nearest neighbor distance vectors in the set of training data.

2. The method of claim 1, further comprising:
   acquiring a digital image of the hand; and
   segmenting the digital image of the hand into the digitally-imaged hand parts, the digitally-imaged hand parts including at least one finger part and a palm part.

3. The method of claim 1, wherein computing the set of feature parameters representing the geometry of a particular digitally-imaged hand part comprises computing a set of contour-based feature parameters for the particular digitally-imaged hand part.

4. The method of claim 1, wherein computing the set of feature parameters representing the geometry of a particular digitally-imaged hand part comprises computing a set of Zernike moments for the particular digitally-imaged hand part.

5. The method of claim 1, wherein computing the set of feature parameters representing the geometry of the particular digitally-imaged hand part comprises computing a set of region-based feature parameters for the particular digitally-imaged hand part.

6. The method of claim 1, wherein computing the set of feature parameters representing the geometry of the particular digitally-imaged hand part comprises computing a set of Fourier descriptors for the particular digitally-imaged hand part.

7. The method of claim 1, further comprising, prior to computing the similarities of the set of digitally-imaged hand parts from each of the first and second eigenspaces, applying Principal Component Analysis to the set(s) of feature parameters for the set of one or more digitally-imaged hand parts.

8. The method of claim 1, wherein using the computed distances to classify the gender of the hand as belonging to the male class or the female class comprises:
   classifying the gender of the hand as belonging to the class to which the set of digitally-imaged hand parts is closest.

9. The method of claim 1, wherein using the computed distances to classify the gender of the hand as belonging to the male class or the female class comprises:
   combining the distances into a classification score; and
   classifying the gender of the hand by comparing i) the classification score to ii) a threshold computed from a set of training data.

10. The method of claim 1, further comprising:
    separately performing said computation of distances for each of at least two sets of one or more of the digitally-imaged hand parts, each performance of the computation of distances being undertaken with respect to a different set of eigenspaces, and each of the different sets of eigenspaces corresponding to a particular set of digitally-imaged hand parts;

wherein using the computed distances to classify the gender of the hand as belonging to the male class or the female class includes, for each particular set of digitally-imaged hand parts, combining the distances of the particular set into a classification score;

in accordance with a weighting function, assigning weights to the classification scores;

combining the weighted classification scores into an overall score for the hand; and classifying the gender of the hand by comparing i) the overall score for the hand to ii) a threshold computed from a set of training data.

11. The method of claim 10, wherein the overall score is a sum of the weighted classification scores.

12. The method of claim 1, wherein the digitally-imaged hand parts include five digitally-imaged finger parts and one digitally-imaged palm part, the method further comprising:

separately performing said computation of distances for each of the digitally-imaged hand parts, each performance of the computation of distances being undertaken with respect to a different set of eigenspaces, and each of the different sets of eigenspaces corresponding to a particular type of digitally-imaged hand part;

wherein using the computed distances to classify the gender of the hand as belonging to the male class or the female class includes, for each particular digitally-imaged hand part, combining the distances of the particular digitally-imaged part into a classification score;

in accordance with a weighting function, assigning weights to the classification scores;

combining the weighted classification scores into an overall score for the hand; and classifying the gender of the hand by comparing i) the overall score for the hand to ii) a threshold computed from a set of training data.

13. The method of claim 1, further comprising:

separately performing said computation of distances for each of at least two sets of one or more of the digitally-imaged hand parts, each performance of the computation of distances being undertaken with respect to a different set of eigenspaces, and each of the different sets of eigenspaces corresponding to a particular set of digitally-imaged hand parts;

wherein using the computed distances to classify the gender of the hand as belonging to the male class or the female class includes, for each particular set of digitally-imaged hand parts, using the computed distances for the particular set to classify the gender of the particular set; and classifying the gender of the hand based on the classifications of the at least two sets of digitally-imaged hand parts.

14. The method of claim 13, wherein classifying the gender of the hand based on the classifications of the at least two sets of digitally-imaged hand parts comprises:

classifying the gender of the hand based on a majority vote of the classifications of the at least two sets of digitally-imaged hand parts.

15. A gender classification computing system comprising:
at least one processing unit;
at least one memory; and
computer-executable instructions stored in the at least one memory, the computer-executable instructions, when executed by the at least one processing unit to, for each of at least two digitally-imaged hand parts, where each of the at least two digitally-imaged hand parts corresponds to one of a plurality of hand parts, compute a set of feature parameters representing a geometry of the digitally-imaged hand part;

using the sets of feature parameters for a set of two or more of the digitally-imaged hand parts, (a) combining sets of feature parameters for different hand parts to form sets of feature parameters for multiple hand parts, wherein a first set of feature parameters corresponds to a hand's fingers and a second set of feature parameters corresponds to the hand's palm and (b) compute distances of the set of digitally-imaged hand parts from each of i) a first eigenspace corresponding to a male class, and ii) a second eigenspace corresponding to a female class; and use the computed distances to classify the gender of the hand as belonging to the male class or the female class comprising:

forming a distance vector from the computed distances;
comparing the distance vector to each of k-nearest neighbor distance vectors in a set of training data; and
classifying the gender of the hand as belonging to the class corresponding to a majority of the k-nearest neighbor distance vectors in the set of training data.

16. The gender classification computing system of claim 15, further comprising a camera, wherein the computer-executable instructions, when executed by the at least one processing unit, further cause the at least one processing unit to,
acquire a digital image of the hand using the camera; and
segment the digital image of the hand into the digitally-imaged hand parts, the digitally-imaged hand parts including finger parts and a palm part.

17. The gender classification computing system of claim 15, further comprising a scanner, wherein the computer-executable instructions, when executed by the at least one processing unit, further cause the at least one processing unit to,
acquire a digital image of the hand using the scanner; and
segment the digital image of the hand into the digitally-imaged hand parts, the digitally-imaged hand parts including finger parts and a palm part.

18. The gender classification computing system of claim 15, wherein the computer-executable instructions, when executed by the at least one processing unit, cause the at least one processing unit to use the computed distances to classify the gender of the hand as belonging to the class to which the set of digitally-imaged hand parts is closest.

19. The gender classification computing system of claim 15, wherein the computer-executable instructions, when executed by the at least one processing unit, cause the at least one processing unit to,
combine the distances into a classification score; and
classify the gender of the hand by comparing i) the classification score to ii) a threshold computed from a set of training data.

20. A method of classifying the gender of a hand having a plurality of hand parts, the method comprising:
for each of at least two digitally-imaged hand parts, where each of the at least two digitally-imaged hand part corresponds to one of the plurality of hand parts, computing a set of feature parameters representing a geometry of the digitally-imaged hand part;

using the sets of feature parameters for a set of two or more of the digitally-imaged hand parts, (a) combining sets of feature parameters for different hand parts to form sets of feature parameters for multiple hand parts, wherein a first set of feature parameters corresponds to a hand's fingers and a second set of feature parameters corresponds to the hand's palm and (b) computing a distance of each of at least two sets of two or more digitally-imaged hand parts to each of (i) a first model eigenspace corresponding to first particular set of digitally-imaged hand parts of a male class, and (ii) a second model eigenspace corresponding to a second particular set of digitally-imaged hand parts of a female class;

using the computed distances to classify the gender of the hand as belonging to the male class or the female class comprises:
  for each particular set of digitally-imaged hand parts, combining the distances of the particular set into a classification score;
  in accordance with a weighting function, assigning weights to the classification scores;
  combining the weighted classification scores into an overall score for the hand; and
  classifying the gender of the hand by comparing i) the overall score for the hand to ii) a threshold computed from a set of training data.

21. The method of claim 20, further comprising:
acquiring a digital image of the hand; and
segmenting the digital image of the hand into the digitally-imaged hand parts, the digitally-imaged hand parts including at least one finger part and a palm part.

22. The method of claim 20, wherein computing the set of feature parameters representing the geometry of a particular digitally-imaged hand part comprises computing a set of contour-based feature parameters for the particular digitally-imaged hand part.

23. The method of claim 1, wherein computing the set of feature parameters representing the geometry of a particular digitally-imaged hand part comprises computing a set of Zernike moments for the particular digitally-imaged hand part.

24. The method of claim 1, wherein computing the set of feature parameters representing the geometry of the particular digitally-imaged hand part comprises computing a set of region-based feature parameters for the particular digitally-imaged hand part.

25. The method of claim 1, wherein computing the set of feature parameters representing the geometry of the particular digitally-imaged hand part comprises computing a set of Fourier descriptors for the particular digitally-imaged hand part.

26. The method of claim 1, further comprising, prior to computing the similarities of the set of digitally-imaged hand parts from each of the first and second eigenspaces, applying Principal Component Analysis to the set(s) of feature parameters for the set of one or more digitally-imaged hand parts.

27. The method of claim 1, wherein using the computed distances to classify the gender of the hand as belonging to the male class or the female class comprises:
  classifying the gender of the hand as belonging to the class to which the set of digitally-imaged hand parts is closest.

28. The method of claim 1, wherein using the computed distances to classify the gender of the hand as belonging to the male class or the female class comprises:
  forming a distance vector from the computed distances;
  comparing the distance vector to each of k-nearest neighbor distance vectors in a set of training data; and
  classifying the gender of the hand as belonging to the class corresponding to a majority of the k-nearest neighbor distance vectors in the set of training data.

29. The method of claim 1, wherein using the computed distances to classify the gender of the hand as belonging to the male class or the female class comprises:
  combining the distances into a classification score; and
  classifying the gender of the hand by comparing i) the classification score to ii) a threshold computed from a set of training data.

30. The method of claim 1, wherein the overall score is a sum of the weighted classification scores.

31. The method of claim 1, wherein the digitally-imaged hand parts include five digitally-imaged finger parts and one digitally-imaged palm part.

32. A gender classification computing system, comprising:
at least one processing unit;
at least one memory; and
computer-executable instructions stored in the at least one memory, the computer-executable instructions, when executed by the at least one processing unit to,
  for each of at least two digitally-imaged hand parts, where each of the at least two digitally-imaged hand parts corresponds to one of a plurality of hand parts, compute a set of feature parameters representing a geometry of the digitally-imaged hand part;
using the set(s) of feature parameters for a set of two or more of the digitally-imaged hand parts, (a) combining sets of feature parameters for different hand parts to form sets of feature parameters for multiple hand parts, wherein a first set of feature parameters corresponds to a hand's fingers and a second set of feature parameters corresponds to the hand's palm and (b) computing a distance of each of at least two sets of two or more digitally-imaged hand parts to each of (i) a first model eigenspace corresponding to first particular set of digitally-imaged hand parts of a male class, and (ii) a second model eigenspace corresponding to a second particular set of digitally-imaged hand parts of a female class;
using the computed distances to classify the gender of the hand as belonging to the male class or the female class comprises:
  for each particular set of digitally-imaged hand parts, combining the distances of the particular set into a classification score;
  in accordance with a weighting function, assigning weights to the classification scores;
  combining the weighted classification scores into an overall score for the hand; and
  classifying the gender of the hand by comparing i) the overall score for the hand to ii) a threshold computed from a set of training data.

33. The gender classification computing system of claim 32, further comprising a camera, wherein the computer-executable instructions, when executed by the at least one processing unit, further cause the at least one processing unit to,
  acquire a digital image of the hand using the camera; and
  segment the digital image of the hand into the digitally-imaged hand parts, the digitally-imaged hand parts including finger parts and a palm part.

34. The gender classification computing system of claim 32, further comprising a scanner, wherein the computer-executable instructions, when executed by the at least one processing unit, further cause the at least one processing unit to,
  acquire a digital image of the hand using the scanner; and segment the digital image of the hand into the digitally-imaged hand parts, the digitally-imaged hand parts including finger parts and a palm part.

35. The gender classification computing system of claim 32, wherein the computer-executable instructions, when executed by the at least one processing unit, cause the at least one processing unit to use the computed distances to classify the gender of the hand as belonging to the class to which the set of digitally-imaged hand parts is closest.

36. The gender classification computing system of claim 32, wherein the computer-executable instructions, when executed by the at least one processing unit, cause the at least one processing unit to,
    form a distance vector from the computed distances;
    compare the distance vector to each of k-nearest neighbor distance vectors in a set of training data; and
    classify the gender of the hand as belonging to the class corresponding to a majority of the k-nearest neighbor distance vectors in the set of training data.

37. The gender classification computing system of claim 32, wherein the computer-executable instructions, when executed by the at least one processing unit, cause the at least one processing unit to,
    combine the distances into a classification score; and
    classify the gender of the hand by comparing i) the classification score to ii) a threshold computed from a set of training data.

* * * * *